(12) United States Patent
Wells et al.

(10) Patent No.: US 9,004,836 B2
(45) Date of Patent: Apr. 14, 2015

(54) SECURITY FASTENER

(75) Inventors: Patrick Wells, West Sussex (GB);
Ayantika Mitra, Middlesex (GB)

(73) Assignee: Atomic 22 Limited (GB)

( * ) Notice: Subject to any disclaimer, the term of this patent is extended or adjusted under 35 U.S.C. 154(b) by 212 days.

(21) Appl. No.: 13/635,175

(22) PCT Filed: Mar. 15, 2011

(86) PCT No.: PCT/GB2011/000361
§ 371 (c)(1),
(2), (4) Date: Sep. 14, 2012

(87) PCT Pub. No.: WO2011/114097
PCT Pub. Date: Sep. 22, 2011

(65) Prior Publication Data
US 2013/0011215 A1    Jan. 10, 2013

(30) Foreign Application Priority Data

Mar. 15, 2010   (GB) ................................. 1004187.9
Oct. 4, 2010   (GB) ................................. 1016679.1

(51) Int. Cl.
*F16B 23/00*    (2006.01)
*F16B 37/00*    (2006.01)

(52) U.S. Cl.
CPC ................................. *F16B 23/0007* (2013.01)

(58) Field of Classification Search
USPC ............ 81/460; 411/402, 403, 427, 548, 910; 70/225, 226, 229, 232, 233
See application file for complete search history.

(56) References Cited

U.S. PATENT DOCUMENTS

| | | | |
|---|---|---|---|
| 1,447,564 A * | 3/1923 | Norlund et al. ................ | 411/337 |
| 2,823,725 A | 2/1958 | Trinca | |
| 3,874,258 A | 4/1975 | Semola et al. | |
| 4,018,111 A * | 4/1977 | Goldhaber ...................... | 81/436 |
| 4,242,932 A | 1/1981 | Barmore | |
| 4,502,825 A | 3/1985 | Yamada | |
| 4,618,299 A | 10/1986 | Bainbridge et al. | |
| 4,674,306 A | 6/1987 | Halpern | |
| 4,726,723 A | 2/1988 | Bainbridge | |
| 4,897,008 A | 1/1990 | Parks | |
| 954,528 A | 9/1990 | Mao et al. | |
| 5,007,260 A * | 4/1991 | Sharp ............................. | 70/233 |

(Continued)

FOREIGN PATENT DOCUMENTS

| | | |
|---|---|---|
| FR | 2712845 B2 | 2/1995 |
| GB | 753367 | 7/1956 |

(Continued)

OTHER PUBLICATIONS

PCT Search Report for PCT Application No. PCT/GB2011/000361, Nov. 14, 2011, 4 pages.

(Continued)

*Primary Examiner* — David B Thomas
(74) *Attorney, Agent, or Firm* — Maine Cernota & Rardin

(57) ABSTRACT

A security fastener, for use with a corresponding key, having a channel in a head of the security fastener for receiving the key, the bottom of the channel being profiled wherein the depth of the channel varies along the length of the channel; a key for use with a security fastener; a combination, or a kit of parts, comprising a security fastener; a method of manufacturing a security fastener; and a method of processing an order for a security fastener.

42 Claims, 17 Drawing Sheets

(56) References Cited

U.S. PATENT DOCUMENTS

| | | | |
|---|---|---|---|
| 5,137,407 A | 8/1992 | Yamamoto | |
| 5,199,838 A | 4/1993 | Luke et al. | |
| 5,279,190 A | 1/1994 | Goss et al. | |
| 5,366,330 A | 11/1994 | Cosenza | |
| 5,378,101 A | 1/1995 | Olson et al. | |
| 5,592,861 A | 1/1997 | Barmore | |
| 5,598,753 A * | 2/1997 | Lee | 81/460 |
| 5,730,567 A | 3/1998 | Haseley et al. | |
| 5,863,166 A | 1/1999 | Young | |
| 5,950,506 A | 9/1999 | Busse | |
| 6,017,177 A | 1/2000 | Lanham | |
| D432,006 S * | 10/2000 | Hussaini | D8/397 |
| 6,186,718 B1 | 2/2001 | Fogard | |
| 6,295,900 B1 | 10/2001 | Julicher et al. | |
| 6,341,927 B2 | 1/2002 | Hampson et al. | |
| 6,988,432 B2 | 1/2006 | Brooks | |
| 8,061,169 B2 | 11/2011 | Young | |
| 8,156,774 B2 * | 4/2012 | Tribout et al. | 70/233 |
| 8,388,294 B2 * | 3/2013 | Lanneree | 411/403 |
| 2003/0019259 A1 | 1/2003 | Nicodemus | |
| 2003/0165371 A1 * | 9/2003 | Notaro et al. | 411/402 |
| 2004/0182206 A1 | 9/2004 | Korpi | |
| 2005/0126349 A1 * | 6/2005 | Trank et al. | 81/460 |
| 2005/0232722 A1 | 10/2005 | Dilling | |
| 2006/0086214 A1 * | 4/2006 | Smed | 81/461 |
| 2007/0140811 A1 | 6/2007 | Hoyt | |
| 2009/0129887 A1 * | 5/2009 | Chang | 411/402 |
| 2010/0111641 A1 | 5/2010 | Zoller | |

FOREIGN PATENT DOCUMENTS

| | | |
|---|---|---|
| GB | 2093140 A | 8/1982 |
| GB | 2095356 A | 11/1982 |
| GB | 2235268 A | 2/1991 |
| GB | 2302575 A | 1/1997 |
| GB | 2320543 A | 6/1998 |
| SU | 410176 A1 | 1/1974 |
| WO | 8404481 | 11/1984 |
| WO | 2008138907 A1 | 11/2008 |

OTHER PUBLICATIONS

GB Search Report for Application No. GB1104382.5, Mar. 30, 2011, 2 pages.
GB Combined Search & Examination Report for Application No. GB1209481.9, md Sep. 28, 2012, 4 pages.
GB Search Report for Application No. GB1104382.5, Mar. 26, 2013, 2 pages.

* cited by examiner

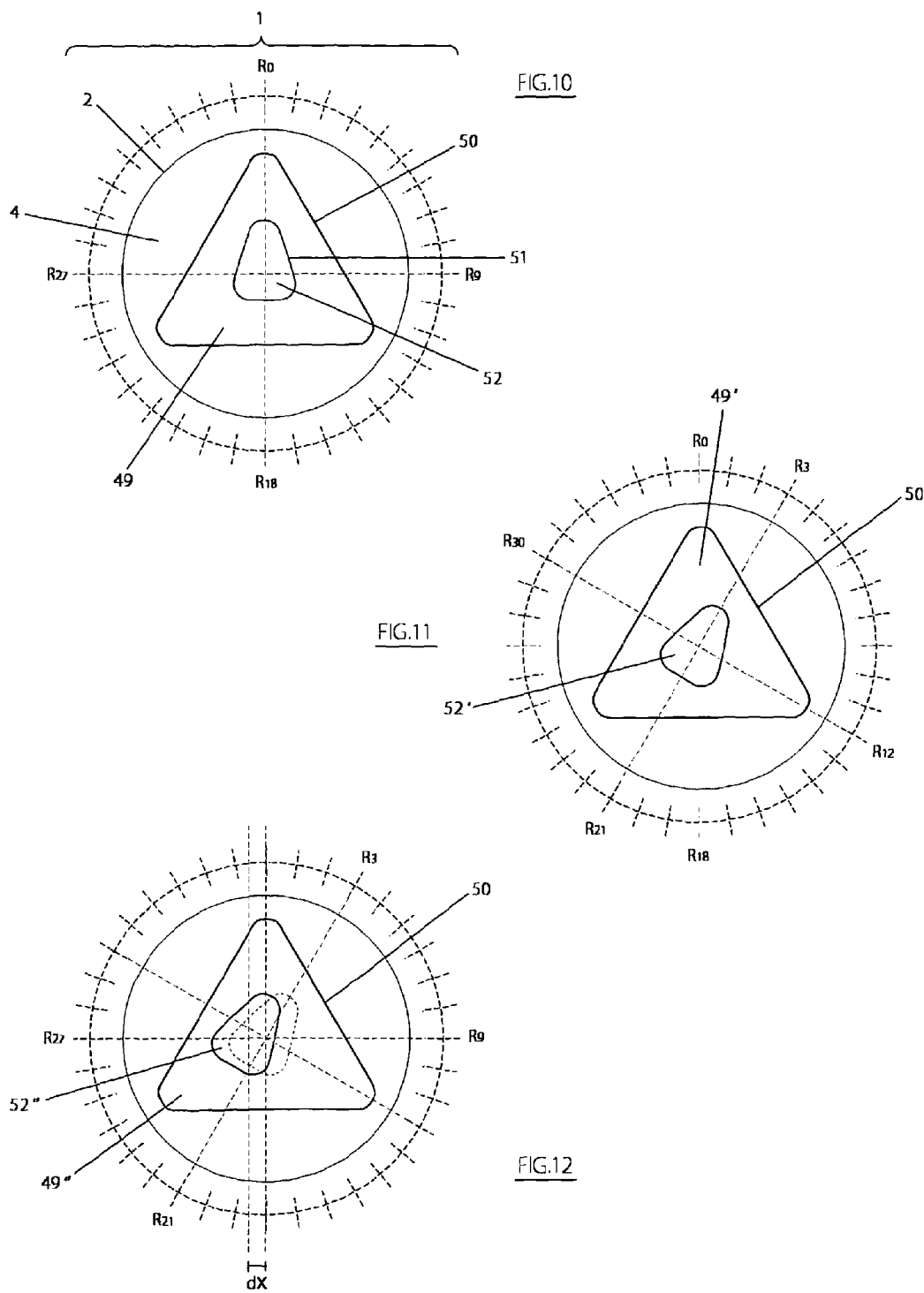

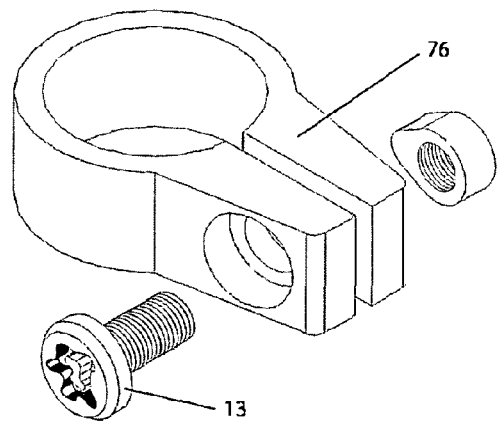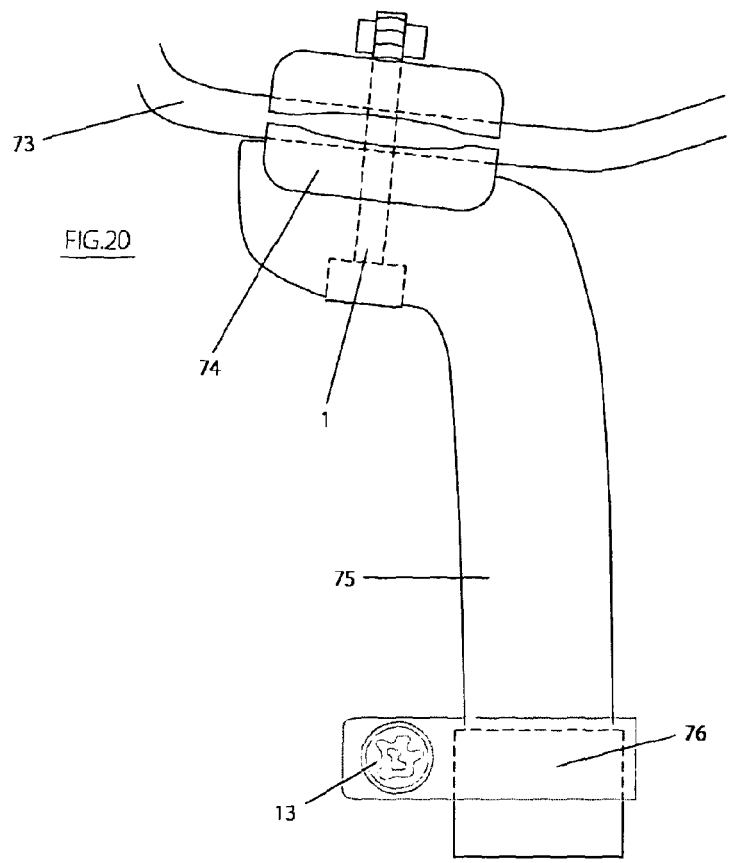

SECURITY FASTENER

The present invention relates to fasteners such as threaded bolts, nuts for threaded bolts and the like, which are designed to be resistant to tampering thereby offering security against unwanted removal. The present invention further relates to a method of manufacturing such security fasteners. Specifically, it relates to such fasteners as designed for securing bicycle components to the bicycle frame.

BACKGROUND

The inexorable trend towards cycling as a primary mode of transport for residents of urban areas and the rising cost of bicycles and their components has raised the importance of the issue of bicycle security. Bike theft is a major problem in many cities but there is a strengthening trend in 'stripping' bicycles of their components which are removable with common tools rather than trying to break a high security bicycle lock to remove the entire bicycle. With a very high proportion of a bicycle's value contained in its components, the issue of securing these components to the bicycle frame in a way which prevents unwanted removal is of paramount importance as with all the components secured to the frame in such fashion, securing the frame to a permanently fixed object then fully protects the cyclist's bicycle.

There are a few commercially available products for securing some of the components of a bicycle to the frame in a tamper resistant fashion. These products seek to secure components to the frame using tamper-resistant fasteners which require a specific key in order that the fastener securing the component be tightened or removed with the specific key being common to these security fasteners for all the components secured in this way on an individual bicycle but with the specific keys for a plurality of bicycles differing from one another. However, these products are inadequate in the extent of the protection they offer. Typically, these products have been developed to secure those components which are generally secured to the bicycle frame using 'quick-release' skewers, namely front and rear wheels and the seatpost, that is the post which inserts into the bicycle frame to which the saddle is attached at the other end. In first seeking to replace the 'quick release' skewers with secure fasteners, the design of these security fasteners renders them inapplicable to securing many other component parts of the bicycle as the requirements for such fasteners differ to those of the 'quick-release' skewers. The most obvious example of the shortcoming of currently commercially available products being contained in the paradox that while they specifically seek to provide 'saddle security' by securing the seatpost to the frame, the saddle itself, which can be a very expensive item, is left available to be removed by anyone so inclined who has in their possession a standard hex key. The primary reasons why existing designs of security fasteners are unable to offer a tamper-resistant method of securing components to the bicycle frame generic to the majority of components are:

i. the differing dimensions in the variety of regular fasteners used to secure components to the frame
  ii. the small physical dimensions of many of these fasteners, and
  iii. the fact that many of these fasteners recess into the frame or the component being secured.

There are several elements to the design of a 'security' fastener. The first two considerations relate to the ability of the fastener to perform its primary function i.e. that of a fastener as this requires that:

i. it is able to convert force applied to achieve the necessary torque to secure the fixture, and
  ii. that the fastener and key be able to withstand repeated application of this force without a loss of material integrity.

The further elements in the design of a 'security' fastener are the two primary aspects in considering the security afforded a component by the security fastener. These are iii. the degree to which the fastener can resist attempts to effect its removal using unauthorized tools, and
  iv. the degree to which the specific key owned by the user for manipulation of the fasteners on their bicycle is unique.

Existing designs of fasteners are inadequate in providing sufficient security for the majority of components on a bicycle for a large number of cyclists. This is since fulfilling any one or more of the fundamental requirements results in fasteners that require physical dimensions which render them inapplicable to the general application of securing all components of high proportional value to the bicycle frame, which includes the applications requiring a small diameter fastener. Thus, there remains a need for a tamper-resistant fastening assembly capable of securing the majority of valuable components to a bicycle's frame with all such fasteners on an individual bicycle actuated by a single specific key, the specific keys for individual bicycles being different from one another. The object of the invention is to provide such a solution.

The following includes a description of prior art in the general field of security fasteners including those related to bicycle security highlighting the inadequacies of existing designs in the context of the object of this invention.

A wide variety of 'anti-theft', 'tamper-proof' or 'security' fasteners have been suggested to secure objects using threaded fasteners such as nut and bolt combinations with co-operating threads; the objective of the suggested designs being to prevent unwanted removal using commonly available tools. Such fasteners have two common features. The first feature commonly incorporated into such designs seeks to hamper attempts to grip the fastener with tools such as wrenches or pliers. Typically, these designs involve a smooth outer surface of a cylindrical or frusto-conical body and/or a coaxial rotating shroud external to the fastener's body. The other common feature is a design requiring a special key to enact tightening or releasing of the fastener. Suggested designs of this second key feature can broadly be categorised in six ways;

i. fasteners whose face contains a plurality of holes and/or pegs into which fit the complementary pins and/or holes of a specially designed key
  ii. fasteners with a cylindrical or frusto-conical body with a single key receiving recess in the face
  iii. fasteners with a cylindrical or frusto-conical body with a key-receiving groove in the face
  iv. fasteners with a cylindrical or frusto-conical body with a central post located in a key receiving recess in the face
  v. fasteners whose external body is not circular and is instead protected by a rotating shroud or ring and finally,
  vi. fasteners with a cylindrical or frusto-conical body with a multi-tiered recess in the face.

Examples of each category of fastener are given below.

Examples of the first category of security fasteners, those whose faces contain a plurality of holes and/or pegs into which fit the complementary pins and/or holes of a specially designed key can be seen in UK patent applications 2,095, 356, 2,302,575 and U.S. Pat. Nos. 954,528, 5,199,838, 5,863, 166 and French patent 2,712,845. Although such designs make removal difficult, it is still possible to either rotate the nut using other tools such as adjustable in spanners, needle nose pliers etc or to modify the fastener or create a proxy key using simple commonly available tools.

An improvement on these designs which specifically relates to securing bicycle components to the frame is suggested in U.S. Pat. No. 6,341,927 which teaches a fastener with a convex head for rotation about a vertical axis. The head contains at least two cut-outs to provide two generally vertical engaging surfaces for engagement by a mating member on a specific key, one for clockwise rotation the other for counter-clockwise rotation. Interruption of the side-wall of the cut-out adjacent to the counter-clockwise engagement surface prevents counter-clockwise rotation by a tool other than the specific key. While the design is a marked improvement on other preceding designs, it will be appreciated that it is still a very quick and simple task to modify the fastener's engagement points slightly with readily available tools to enable rotation by commonly available tools such as needle nose pliers. However, the design also carries another limitation which is of far greater concern in the context of the object of this invention which is explained below.

A plethora of suggestions exist for the second category of fasteners identified based on a single key receiving recess in the face of the fastener's head. These range from those primarily designed to improve the ability to apply torque such as U.S. Pat. Nos. 5,279,190 and 5,137,407 which teach designs which ensure a high and stable conversion efficiency of torque to suggestions such as those contained in U.S. Pat. Nos. 5,378,101 and 4,618,299 which suggest multi-lobular recesses in the fastener's head to accommodate a specific mating key to effect rotation of the fastener about its axis. The weakness of any such designs in a security application is that the risk exists of an unwanted rotation of the fastener being achieved by common tools which can be forced in to the recess and adequately engage the head to apply enough torque or the minor modification of the recess to accommodate such a tool. Typically, such compromise can be achieved using standard tools such as hex keys, 'Torx' heads, bladed instruments etc.

The third category of designs for security fasteners suggests a fastener body which contains a key receiving groove. One advantage of such designs is that application of torque to the head is far less likely to damage the head of the fastener and so they are appropriate for high torque applications. U.S. Pat. No. 6,186,718 suggests such a fastener with a simple triangular groove for this specific purpose. However, it will be appreciated that using simple geometric designs provides a very limited range of possibilities for generating permutations for unique keys. Better examples can be seen in U.S. Pat. Nos. 4,674,306 and 5,730,567. Both teach a fastener the rotation of which about its vertical axis requires engagement by the insertion of the mating member of a specific key into a curvilinear groove in the fastener's head.

The fourth category of fasteners seeks to overcome the weakness of using modified standard tools through the positioning of a central post in the key receiving recess contained in the fastener's face. Such designs are widely commercially available and consist of a cylindrical central post within an otherwise standard key receiving recess such as a recess which fits a standard hex or 'Torx' key thus obstructing actuation by a standard and widely available key and also obstructing the insertion of unauthorised objects such as bladed instruments.

The fifth category of fasteners are those in which the fastener is designed so that the external wall of the central body of the threaded fastener provides the key receiving surface and is rendered inaccessible to gripping tools and thus unwanted removal by rotation using such tools by a coaxially rotating shroud or ring mounted on the central body. Such a feature is also commonplace in the design of security fasteners even when the central body is of a smooth cylindrical or frusto-conical form. Examples can be seen in U.S. Pat. Nos. 5,730,567, 4,726,723 and 4,897,008. In these designs it is an additional level of security against unwanted removal by gripping tools. However, for designs of security fasteners in which the outer surface of the body is not of cylindrical or conical form then such freely rotating shrouds are a vital element of security. A good example of such a design which specifically relates to securing bicycle components to the frame is seen in U.S. Pat. No. 5,950,506 which teaches a threaded nut of irregular periphery which is protected by a freely rotating cylindrical cap whose cylindrical wall surrounds the nut. The irregular periphery of the nut is designed such the nut can only be actuated by a specific key. The shortcoming in the context of the object of this invention is explained below.

The final category of fasteners uses a multi-tiered recess in the face of the fastener as the key-accepting engagement surface. U.S. Pat. No. 6,988,432 teaches such a design which uses tiered polygons to provide stability to a driving tool and improve the stability of the delivery of torque. U.S. Pat. No. 6,017,177 teaches a multi-tiered recessed design using a multi-lobular driving tier and irregularities in the mating surface of the other tiers. In addition to providing stability to the driving tool, the configuration of stabilizing tiers can be changed to produce an extremely large number of patterns required for a specific mating key to engage the fastener successfully. Such designs still suffer from the same weakness as the single tier recessed design in that it is possible that a bladed instrument may be inserted, possibly even across tiers, and successfully engage the fastener or alternatively, some other commonly available tool may be used to force a mating or modify the recess to achieve such a mating. Additionally, security is not a function of successful replication of three tiers but reduces to the permutations contained in a single tier as a key obtained can have the lower tier(s) ground away thus rendering any fastener with a matching upper tier vulnerable to unwanted removal.

The object of the invention is to design security fasteners which secure the majority of bicycle components to the bicycle frame and certainly all those of high proportional value which includes those components which require a small diameter fastener to secure them to the frame. This set of fasteners owned by a single individual should only be able to be actuated by the use of a single specific key which is complementary to all the fasteners on the individual's bicycle. For each other individual owning a similar set of fasteners their set should require a different specific complementary key. Thus, the main requirements of such a design are that firstly, all components of significant value can be secured to the bicycle to protect from unwanted removal and secondly, that the specific key is unique to the owner or as close to unique that the possibility of someone obtaining a replica key through legitimate means is inconceivable. Obviously this second consideration requires that the design of the security fastener can generate a very high number of permutations for unique specific keys.

The concept of using security fasteners to secure components to the bicycle frame is not new in itself and some of the preceding examples were developed with exactly this objective, notably U.S. Pat. Nos. 6,341,927 and 5,950,506, UK patents 2,095,356 and 2,302,575. However, there are major shortcomings in existing designs specifically for this objective and for the same or other reasons existing designs of security fasteners inappropriate in the context of this application.

To understand the shortcomings of existing designs for security fasteners requires an understanding of the requirements for the usual fasteners used to secure bicycle components in their normal function as simple fasteners. For some bicycle components, high levels of torque need to be applied to adequately secure the component to the frame due to the forces the component is subjected to in normal use which risk detachment of the component and the potentially dire consequences for the cyclist. For example, the rear wheel (particularly for a fixed gear bicycle) and the end bolts of square taper cranks require the fasteners to be secured using high levels of torque. The other consideration of extreme importance are the physical dimensions of the fasteners.

The different components on the bicycle require different fasteners and these frequently differ in dimension. Most importantly, a lot of components of significant proportional value require fasteners that have very small dimensions as these fasteners, typically bolts, recess into the component that they are securing to the frame or into the frame itself in their tightened position. Existing designs such as the examples referred to which have been developed for this specific application have typically been developed to secure the components to the bicycle frame which are usually secured by fasteners known as 'quick release skewers'. These components are the wheels and the seatpost which inserts into the bicycle frame on top of which the saddle is secured. However, in the design of fasteners successful in hampering unwanted removal of these components, the general applicability of the fastener has been compromised. That is to say, the same design cannot be used to secure other valuable components of the bicycle.

A great paradox can be seen in the attempt to prevent unwanted removal of the bicycles seat. Commercially available products resulting from U.S. Pat. Nos. 6,341,927 and 5,950,506 successfully secure the seatpost to the bicycle frame yet the bicycle seat is still totally exposed to the risk of unwanted removal by anyone with a standard hex key. The problem in achieving general applicability lies in the conflicting requirements of security (tamper-resistant design and uniqueness of key), a desire to protect the components of a single user's bicycle with one key, the ability to apply adequate torque to the fastener and for the fastener to withstand this torque and the desire for minimal physical dimensions of the fastener to facilitate general application and also for aesthetic considerations.

All existing known designs are a compromise and in attaining the objectives of security (i.e. a tamper-resistant design and a reasonably high number of permutations for the possibilities for a specific key) and practical considerations as a fastener they have rendered the design inapplicable for more general application to include securing components which necessitate a fastener of small dimension. For example, the fastener taught in U.S. Pat. No. 6,341,927 is a relatively weak design from the perspective of torque application and hence requires a large enough diameter to adequately perform its function as a fastener. In so doing, it simultaneously negates the possibility of using the design to secure e.g. a seat to a seatpost in which the fastening bolt recesses into clamping mechanism used to secure the seat to the seatpost. It will be appreciated by those skilled in the art that if this design used a fastener with a smaller diameter face then it is likely that insufficient torque could be applied for the fastener to perform its function of securing safely a component to the bicycle frame and at the same time, the ability to generate a high number of permutations for specific key requirements would be lost. Similarly, to achieve adequate security U.S. Pat. No. 5,950,506 requires a separate freely rotating coaxial shroud located external to the threaded fastening nut which renders the design inapplicable to any applications requiring a small diameter fastener. The design of the nut is also relatively weak from the perspective of torque application and thus requires adequate physical dimension of the nut for the application of torque sufficient to safely secure the components as well as to permit generation of adequate specific key requirements. This results in the same set of problems as in the previous example further compounded by the use of the rotating shroud external to the nut.

Consideration of other designs of security fasteners in the context of this application also reveals inadequacies. To be clear, the object is to design a security fastening system which secures all bicycle components to the frame in which actuation of the fasteners is exclusive to a specific key common to all fasteners used on the bike and that a very high number of different permutations for the possibilities of the specific key may be produced. Thus we are considering fasteners whose external dimensions may be smaller than even 12 mm to allow recessing into components and the frame. Those skilled in the art will appreciate that designing such a fastener(s) runs into the constraints of the ability to preserve material integrity of such a fastener under repeated torque applications and constraints in the production method used e.g. the minimum diameter of appropriate cutting tools in addition to the previously stated requirements. Thus, a design such as a fastener actuated by the mating of a male member key with a curvilinear key receiving groove in the fastener's face which appears appropriate on paper is in reality inadequate in the context of the object of this invention as the material properties of the fastener and/or key and/or the minimum cutting diameter of the tool used in production drastically reduces the number of permutations that can be generated for the design of the specific key and thus compromises the security aspect of the fastener.

It is therefore an object of the present invention to provide a fastening assembly that overcomes the problems in the prior art.

SUMMARY OF THE INVENTION

According to a first aspect of the present invention there is provided a security fastener, for use with a corresponding key, having a channel in a head of the security fastener for receiving the key, the bottom of the channel being profiled wherein the depth of the channel varies along the length of the channel. Profiling the bottom of the channel in this way may allow for differentiating between keys with ostensibly similar if not identically-shaped channels when used with a particular fastener.

Preferably, the channel has inner and outer walls with, in at least one cross-section orthogonal to the axis of rotation of the security fastener, generally non-circular inner and outer profiles. More preferably, the inner and outer profiles are different. This may allow for a very large number of permutations of channel shape and therefore a concomitant number of unique key-channel combinations, potentially a unique combination per user.

According to another aspect of the present invention there is provided a security fastener, for use with a corresponding key, having a channel in a head of the security fastener for receiving the key, the channel having inner and outer walls with, in at least one cross-section orthogonal to the axis of rotation of the security fastener, generally non-circular inner and outer profiles, the inner and outer profiles being different. By providing such a channel, the number of permutations of channels is increased by a very large number. The number of different permutations may be sufficient such that each user of the fasteners may be provided with a unique channel.

Preferably, at least one said non-circular profile is rectilinear, and thus reduces manufacturing complexity. The non-circular profiles may comprise at least three linear sides, in order to enable torque to be transferred via the channel to tighten, or un-tighten, the security fastener. More preferably, each corner formed by two of the at least three sides is filleted.

Preferably, at least one non-circular profile is curvilinear. More preferably, each said curvilinear profile comprises at least three lobes, yet more preferably at least 5 lobes, even more preferably at least 10 lobes. By providing at least three lobes, the number of permutations of the profiles may be increased.

By providing a combination of curvilinear and rectilinear profiles, the number of permutations of channel shape may be yet further increased.

Preferably, the channel has, in at least one cross-section parallel to the axis of rotation of the security fastener, a generally rectilinear profile. More preferably, the inner and outer walls of the channel are substantially parallel to the axis of rotation of the security fastener.

Alternatively, the inner and outer walls of the channel are substantially tapered from said surface to the bottom of said channel, such that the width of the channel is greater at said surface than at said bottom. The tapered walls may not run through the length of the channel, and as such only a partial portion of the channel may have tapered walls. The gradient of the taper may not be consistent throughout the depth of the channel, and as such the taper may vary with depth of the channel wall.

Preferably, the channel has, in at least one cross-section parallel to the axis of rotation of the security fastener, a generally curvilinear profile.

Preferably, the centroid of the inner profile is offset from the centroid of the outer profile.

Preferably, the centroid of the outer profile is substantially on the axis of the fastener. By providing the centroid of the outer profile substantially on the axis of the fastener the torque transfer efficiency from the channel to the fastener is increased.

Preferably, the bottom of the channel is profiled. By providing a profiled bottom to the channel, the number of permutations of channel may be yet further increased. More preferably, the profiled bottom comprises steps and/or is curved. Alternatively, the profile may be formed of a linear interpolation of a required curved profile, and as such the profile may be made from discrete linear sections.

The at least one of said steps may be a substantial proportion of the depth of said channel, such that a non-matching key can not provide sufficient torque to remove the security fastener.

Alternatively, at least one of the peaks of said curved profile may be a substantial proportion of the depth of said channel, such that a non-matching key can not provide sufficient torque to remove the security fastener.

Preferably, the channel is not continuous, such that an inner island bounded by said channel is connected to the outer edge of said channel by at least one connecting member.

Preferably, the security fastener further comprises a sleeve rotatable about the head of said fastener. More preferably, sleeve extends along the entire length of said head. By providing such a sleeve, the security of the fastener may be increased.

Preferably, the head of said fastener is substantially frusto-conical, and thus the security of the fastener may be increased.

Preferably, the security fastener comprises a knurled surface opposite said surface comprising the channel, said knurled surface being adapted to engage with a surface of a component to be fastened by said security fastener.

The channel in the security fastener may be arranged such that a non-fitting key can not provide sufficient torque to remove the security fastener. Thus the security fastener may be resistant to attacks from screwdrivers, wrenches, pliers, and the like.

Preferably, the security fastener is adapted to fasten at least one of the following bicycle components to a bicycle: wheels with hollow axles; wheels with threaded axles; crank arms; road brakes; recessed road brakes; v-brakes; disc brakes; crank bolts; pedals; chainrings; seatpost collars; seatpost binders; saddle clamps; rear derailleur; front derailleur; removable dropouts; ahead stem top cap; quill stem expander; ahead face plate; quill stems; and levers.

Preferably, the security fastener further comprises a threaded shaft, a threaded nut, and a collar located around said shaft, wherein said collar is adapted to increase in diameter as said nut is drawn on to said threaded shaft. The collar may be a split cylinder or a flexible cylinder. The flexible cylinder may be made from rubber or the like, and this may increase the friction between the flexible cylinder and a cylinder that the collar is inserted into. More preferably, the nut is substantially frusto-conical, and thus increased the force on the collar as it is drawn into the collar by the threaded shaft.

Preferably, the security fastener is adapted to internally fit a hollow threaded shaft, wherein said collar is adapted to form an interference fit within said hollow threaded shaft as said nut is drawn on to said threaded shaft. More preferably, the direction of said threaded shaft is adapted such that said nut is drawn further on to said threaded shaft when said hollow threaded shaft is rotated to be un-tightened. Yet more preferably, the hollow shaft is a bicycle pedal, and said security fastener is adapted to substantially lock said pedal to a crank arm of a bicycle. Thus, the security fastener is adapted to prevent the removal of bicycle pedals, and will further secure the pedal to the bicycle if an attempt is made to remove the pedal without the security fastener first being removed. The hollow shaft may be a bicycle crank.

Alternatively, the security fastener further comprises a knurled nut adapted to interference fit within a hollow shaft, the security fastener is adapted to secure said hollow shaft within an external component when said security fastener to tightened into said knurled nut. Preferably, the external component being a bicycle crank arm, and said hollow shaft being a pedal. More preferably, the thread direction of said security fastener is adapted such that said fastener is further tightened into said knurled nut when said hollow threaded shaft is rotated to be un-tightened.

Preferably, the security fastener further comprises at least a partially threaded shaft.

Preferably, the security fastener further comprises a threaded blind hole within the head of said security fastener.

Alternatively, the channel may be incised within an insert, adapted to be inserted within a blank fastener head. The blank fastener preferably has a corresponding orifice to accept said insert. The insert may be bonded and/or press fit within said blank fastener.

According to a further aspect of the present invention there is provided, a key for use with a security fastener as aforementioned. Preferably, the key includes a circumferential groove on the external keying surface.

According to a further aspect of the present invention there is provided a combination, or a kit of parts, comprising a security fastener as aforementioned, and a key as aforementioned. Preferably, the combination, or kit of parts, further comprises a second security fastener as aforementioned, wherein said first security fastener comprises a threaded shaft, and said second security fastener comprises a threaded hole adapted to be screwed on to said first security fastener.

According to a yet further aspect of the present invention, there is provided a method of manufacturing a security fastener as aforementioned, including: generating a first and second machinable profile; and incising the channel in the head of a blank fastener according to the first and second machinable profiles.

Preferably, the method further comprises machining the first profile, and then machining the second profile.

Preferably, the method further comprises associating the first and second profiles with one of a plurality of users, and storing said profiles in a database associated with said one user.

Preferably, the method further comprises machining a key adapted to fit the channel incised within the head of the security fastener.

Preferably, the method further comprises generating a machinable profile for the bottom of said channel, and machining the bottom profile in said channel.

According to a further aspect of the present invention, there is provided a security fastener, for use with a corresponding key, having a channel in a head of the security fastener, within a surface substantially orthogonal to the axis of rotation of the security fastener, the channel having inner and outer walls with, in at least one cross-section orthogonal to the axis of rotation of the security fastener, generally non-circular corresponding inner and outer profiles, the bottom of said channel being profiled.

According to a yet further aspect of the present invention, there is provided a tamper-resistant fastener including a head, for rotation about the longitudinal axis of said fastener, the face of said head being incised with a channel, said channel having an inconsistent width along its length.

In further embodiments, the invention provides a tamper-resistant fastening assembly which can only be rotated about its longitudinal axis by a specific complementary key. The fastener includes a head for rotation about its longitudinal axis. The face of the fastener's head is incised with a key receiving channel which accepts the mating male member of the specific complementary key so that rotation of the fastener about the longitudinal axis may be accomplished through rotation of the key. The specific key receiving channel in the fastener's head may or may not be continuous through a 360 degree rotation about the longitudinal axis of the fastener and is of inconsistent width throughout its length with the walls of the channel being parallel to the longitudinal axis of the fastener. Alternatively, the channel walls are tapered, or form a profile, from the top of the channel. The key receiving channel is formed from a shaped recess within the fastener's head with an 'island' which is not necessarily centrally located extending upwards from said recess so that the top of the 'island' may be flush with the face of the fastener's head with the shape defined by the 'island's' periphery being different to that of the periphery of the recess. That is to say, that the shapes formed by the inner and outer walls of the incision in the fastener's head are incongruous with respect to each other.

Furthermore, the key receiving channel may not necessarily be continuous in that the peripheral wall of the channel may be joined to the periphery of the 'island' by a 'causeway' whose walls extend upwards from the bottom of the channel to be flush with the face of the fastener. The 'floor' of the key receiving channel may be of varying depth along the length of the channel, that is to say that at any two given points along the key receiving channel, the walls of the channel may not be of equal height. Furthermore, the floor of the key receiving channel may not necessarily be orthogonal to the longitudinal axis of the fastener throughout the length of the channel, that is to say that changes in the depth of the channel may be subject to a gradient so that the floor of the channel when viewed in profile may have a 'rippled' or 'rolling' profile. The floor of the key receiving channel may also be orthogonal to the longitudinal axis of the fastener throughout the length of the channel so that any changes in depth of the channel would cause the floor to have a 'stepped' profile.

It will be appreciated that the use of two differing shapes to form the walls of the channels gives rise to a very large number of possibilities for unique specific keys required to actuate the fastener. The possibility of the inclusion of a 'causeway' between the periphery and the 'island' introduces an additional degree of freedom as for any combination of shapes for the periphery and the 'island' the location of the 'causeway' can have many different radial locations through 360 degrees dramatically increasing the permutations possible.

The potential permutations are also massively increased by the use of the third dimension as a 'key' shape in addition to the use of differing shapes of the inner and outer walls. While two keys may have the same shaped key receiving channel when viewed in plan i.e. in 2 dimensions, the third dimension may be dissimilar. In theory, either key could actuate the others complementary fastener however, in such an instance, the design would be such that the shallow points of the channel would prevent a sound enough mating to achieve successful rotation of the fastener by another key with similar shape in the plan view but with enough depth for the specific key to convert the required force to torque successfully. In this way, the design of such a fastener, while still being subject to the same constraints imposed by the method of production and the properties of the materials used in the key and fastener construction, overcomes the undesirable reduction in security through the dramatic fall in the number of permutations possible for known key receiving designs of security fasteners when such designs are considered in the context of a small diameter application. Thus any shape can be used for either the periphery of the recess or the periphery of the 'island' from geometric shapes to irregular shapes constrained only by the production method used and the minimum channel width required due to the material properties of the key and fastener in the context of the repeated application of a known amount of torque. This design is such that small diameter security fasteners can be constructed with comparable levels of security to known designs without loss of primary function as a fastener and can be applied in contexts where other known designs are rendered inapplicable either due to the physical dimension required for the security fastening assembly or due to the reduction in security due to the inability to generate adequate permutations for the possibilities of a specific keys. Examples of such contexts being small diameter recessed bolts or nuts. For example, bolts which recess into the saddle clamps of bicycles to secure the saddle to the seatpost or the recessed nuts which secure the brake assemblies of bicycles to the frame.

In some embodiments of the invention, the fastening assembly includes:

a. a complementary specific key, the end face of which is a raised ridge which fits exactly into the channel in the end face of the fastener in the assembly described below and the other end of which is either recessed to accept a standard tool such as a hex key or the body shaped to be engaged by a standard wrench so that when the key is mated with the complementary fastener described below, the fastener may be rotated by the use of the common tool, the key only being essential to the rotation of the fastener and freely removable thereafter.

For the sake of conciseness, in the description of the embodiments of the invention such a key will only be referred to as 'said complementary key' which will be understood a key as described above but relating to the fastener specific to the that embodiment.

Specifically, the invention provides, in one aspect, a tamper-resistant fastening assembly which comprises of:

a. a threaded bolt, having either a generally cylindrical or a generally frusto-conical main body with a smooth outer surface, a shank which may be wholly or partially threaded extending along the longitudinal axis from the main body and the end face of the main body containing a specific key receiving incision according to the previous description;

b. said complementary key.

In another embodiment, the fastening assembly comprises of:

a. a nut, for engaging a threaded bolt, having either a generally cylindrical or a generally frusto-conical main body with a smooth outer surface and extending away from this main body a hollow cylindrical shank of smaller diameter than the main body with the entire nut containing a threaded bore running partially through its length from the outer end of the shank with the opposite outer end face of the nut having a specific key receiving incision according to the previous description;

b. a cylindrical washer of larger external diameter than the main body of the nut described above and of adequate internal diameter to fit over the cylindrical shank of the nut described above and slightly greater width than the length of the cylindrical part of the nut body described above with one end flat to fit flush to the underside of the main part of the nut body and the opposite end having a knurled face to sit against the bicycle frame and oppose rotation of the washer when said nut is tightened;

c. said complementary key.

Another embodiment of the invention comprises:

a. a threaded bolt, having either a generally cylindrical or a generally frusto-conical main body with a smooth outer surface, a shank extending along the longitudinal axis from the main body the first portion of which is smooth and cylindrical and the further portion of which is threaded and the end face of the main body containing a specific key receiving incision according to the previous description;

b. a nut, for engaging the threaded bolt, having either a generally cylindrical or a generally frusto-conical main body with a smooth outer surface and extending away from this main body a cylindrical body of smaller diameter than the maximum diameter of the main body this smaller diameter cylindrical part of the body containing a threaded bore running through its length along its longitudinal axis with the end face of the main body being either flat or containing a circular recess and the underside of the main body being knurled to oppose rotation when the fastening assembly is tightened;

c. said complementary key.

Yet another embodiment of the fastening assembly compromises:

a. a nut, for engaging a threaded bolt, having either a generally cylindrical or a generally frusto-conical main body with a smooth outer surface and extending away from this main body a cylindrical body of smaller diameter than the maximum diameter of the main body this smaller diameter cylindrical part of the body containing a threaded bore running through its entire length and part way into the main body along its longitudinal axis, the end face opposite to the end containing the bore having a specific key receiving incision according to the previous description;

b. a threaded bolt, having either a generally cylindrical or a generally frusto-conical main body with a smooth outer surface, a shank extending along the longitudinal axis from the main body the first portion of which is smooth and cylindrical and the further portion of which is threaded and the end face of the main body being either flat or containing a circular recess;

c. a generally frusto-conical housing for said bolt head whose outer surface is smooth with a circular recess in the narrower end face of sufficient diameter and longitudinal depth to accommodate said bolt head and with the opposite end face bored to allow the bolt shank to exit and this wider end face having a knurled ridge around its circumference to oppose rotation when the fastening assembly is tightened;

d. a generally frusto-conical housing for said nut whose outer surface is smooth with a circular recess in the narrower end face of sufficient diameter and longitudinal depth to accommodate said nut and with the opposite end face bored to allow the bolt shank to exit and this wider end face having a knurled ridge around its circumference to oppose rotation when the fastening assembly is tightened;

e. said complementary key.

It will be appreciated that the design of the nuts in the embodiments above is consistent with the object of the invention in that the only partial boring of the nut along its longitudinal axis to engage a threaded bolt leaves the entire cross sectional area of the nut face available for security key design which is a far more efficient use of space than conventional designs in which the nut is fully bored along its longitudinal axis thus requiring that the same level of security, that is to say an equal number of permutations for specific key possibilities requires a greater diameter nut periphery. The only compromise being that such design requires that the threaded members which engage the nut are subject to a constraint of maximum error with regard to their axial length.

The invention also provides a computer program and a computer program product comprising software code adapted, when executed on a data processing apparatus, to perform any of the methods described herein, including any or all of their component steps.

The invention extends to methods and/or apparatus substantially as herein described with reference to the accompanying drawings.

Apparatus and method features may be interchanged as appropriate, and may be provided independently one of another. Any feature in one aspect of the invention may be applied to other aspects of the invention, in any appropriate combination. In particular, method aspects may be applied to apparatus aspects, and vice versa.

BRIEF DESCRIPTION OF THE DRAWINGS

Embodiments of this invention will now be described, by way of example only, with reference to the accompanying drawings, of which:

FIGS. 10, 11, 12, 13, 14, 15 are top plan views of further embodiments of tamper-proof fasteners according to the current invention;

FIG. 20 is a side elevation view of the fastener of FIG. 1 being used to secure the saddle to the seat pin and the fastening assembly of FIG. 21 being used to secure the seat pin to the bicycle frame;

FIG. 21 is a perspective view of a fastening assembly comprising of a seatpost clamp, a nut and the fastener of FIG. 3;

DETAILED DESCRIPTION OF THE EMBODIMENTS

Figure 1:
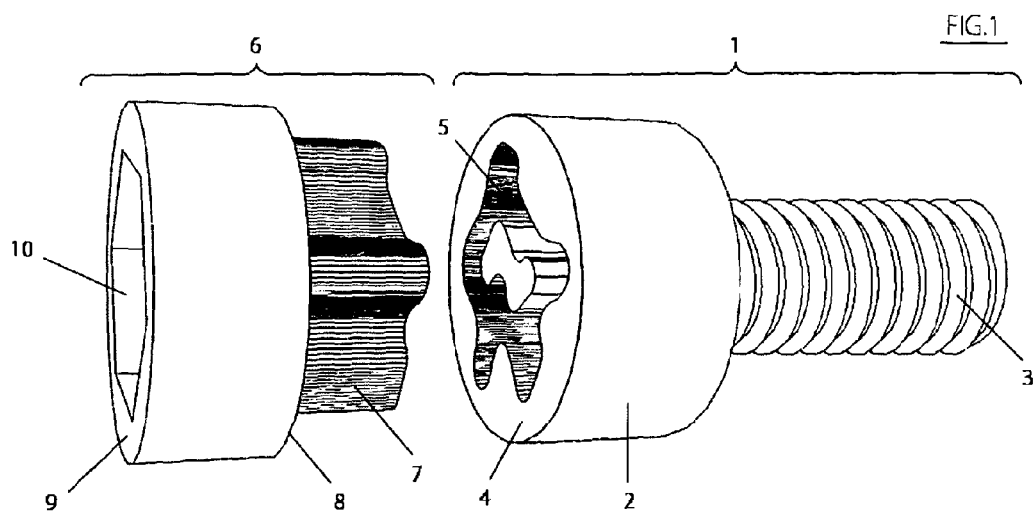
FIG. 1 is a perspective view of a first embodiment of a tamper-proof fastener and the specific complementary key according to the present invention.
Figure 2:
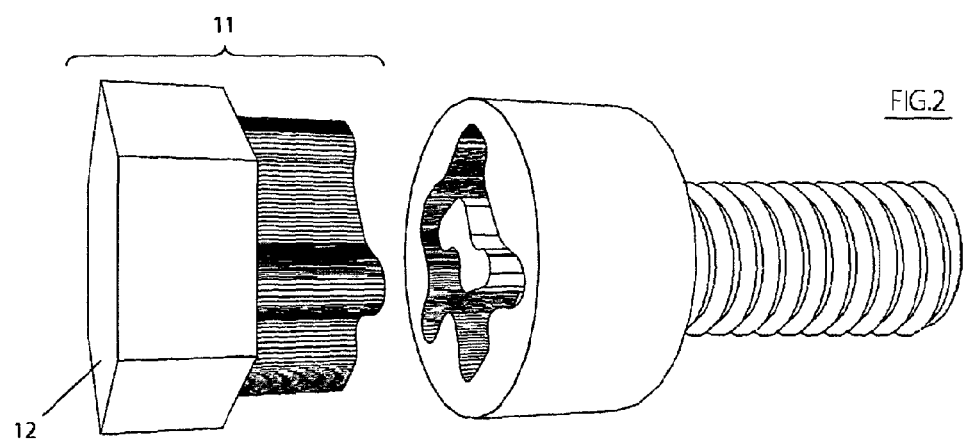
FIG. 2 is a perspective view of the tamper-proof fastener in FIG. 1 and a second embodiment of the specific complementary key.

FIG. 1 illustrates a first embodiment of a tamper-resistant (security) fastener. The tamper-resistant fastener 1 is a threaded bolt comprising of a bolt head 2 which has a generally cylindrical body and a partially threaded shank 3 extending away from the main body 2 along the longitudinal axis of the fastener. The bolt head has an end face 4 which is incised with a specific key receiving channel 5. In the embodiment illustrated, the fastener is designed to replace the existing fastening bolts on a bicycle in the instances where the bicycle component is secured by a single bolt which recesses into the component or the frame itself. Alternatively, it is of course to be understood that the fastener can be utilised to secure any suitable component where some form of secure fixing is required. The bolt can only be actuated by a specific key 6 which has a generally cylindrical form with a male member 7 protruding from end face 8 which exactly fits into the specific key receiving channel 5 in the fastener's body 2. With the key 6 mated with the tamper-resistant fastener 1 the tamper-resistant fastener 1 can be rotated by inserting a standard hex key tool into the hexagonal recess 10 in the end face 9 of the key 6. In the mated state, the end face 4 of the bolt head 2 is flush to the end face 8 of the key 6 which helps to stabilise the key as force is applied. Alternatively, the specific key may have slightly different form in that rather than having a cylindrical body containing a hexagonal recess, its outer body may instead take the form of a hexagon when viewed in plan in order that it may be rotated using a standard wrench. This is illustrated in FIG. 2 where the key 11 has a body of hexagonal shape when viewed from end face 12 with all other elements of the fastening assembly being the same as described in FIG. 1. In a further alternative, the specific key is formed as a stand-alone tool; for example, the specific key is formed on the ends of a standard hex key enabling the specific key to tighten, or un-tighten, the fastener 1 without the requirement of further tools.

Figure 3:
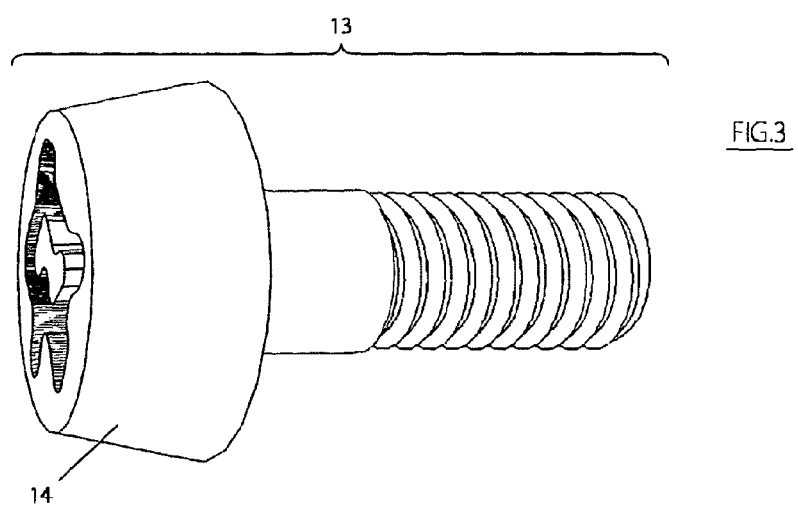
FIG. 3 is a perspective view of a second embodiment of a tamper-proof fastener according to the present invention which requires the same specific complementary key as the fastener shown in FIGS. 1, 2.

FIG. 3 illustrates an embodiment of a tamper-resistant fastener in which the tamper-resistant fastener 13 differs from the embodiment illustrated in FIG. 1 only in that it has a generally frusto-conical body 14. With a smooth outer surface, the generally frusto-conical body 14 of tamper-resistant fastener 13 makes it very difficult for ordinary gripping tools such as wrenches or pliers to gain purchase on the fastener in order to effect rotation. This embodiment is particularly well suited to replacing the fasteners used to secure components to the bicycle frame in which the fastener's head is left exposed. All other aspects of the fastener are the same as the embodiment illustrated in FIG. 1. The tamper-resistant fastener 13 can only be actuated in the using a specific key such as 6 or 7 as in the method described above for rotation of the fastener 1.

Figure 4:
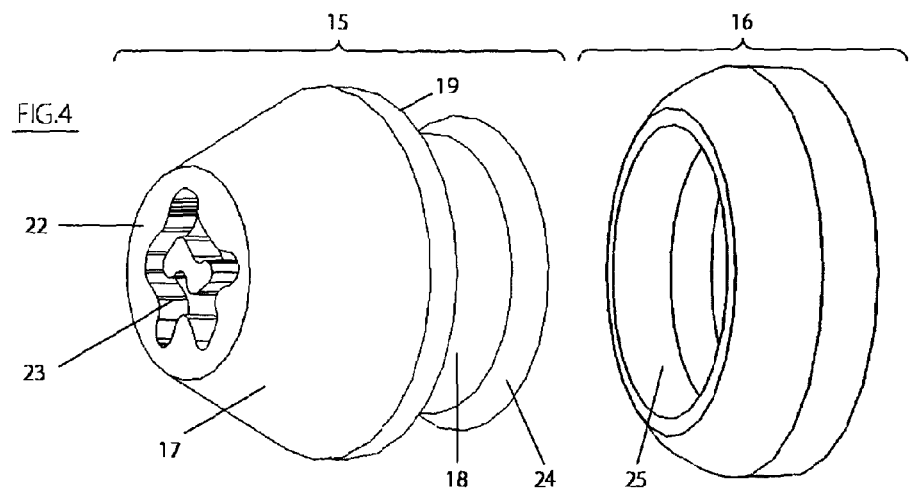
FIG. 4 is an exploded perspective view of a third embodiment of a tamper-proof fastener according to the present invention which requires the same specific complementary key as the fasteners in the previous illustrations and a rotating washer.
Figure 5:
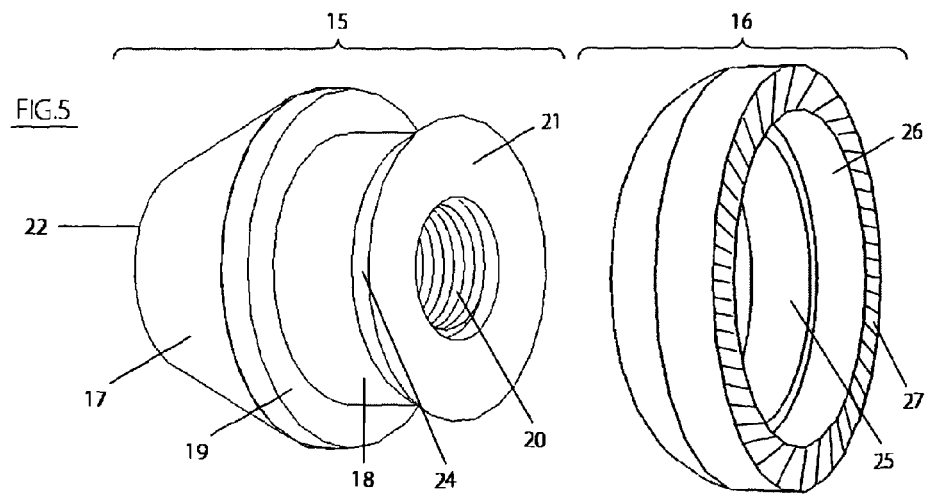
FIG. 5 is an exploded perspective view of the same assembly as shown in FIG. 4 but shown from a different perspective.
Figure 6:
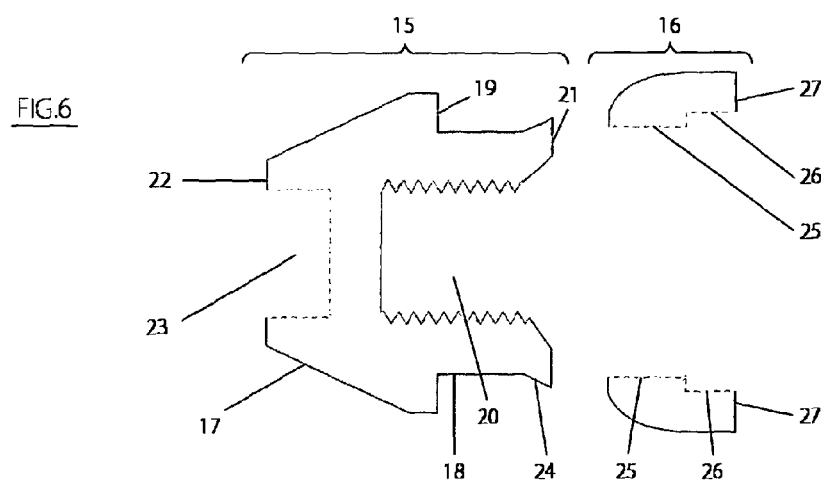
FIG. 6 is a side cross-sectional elevation of the assembly in FIGS. 4, 5.

FIGS. 4, 5, 6 illustrate a further embodiment of a tamper resistant fastener in accordance with the current invention. In this embodiment the fastening assembly consists of a nut 15 and a washer 16. FIG. 4 illustrates the generally frusto-conical main body 17 of the nut 15 and a shank 18 of smaller diameter which extends away from end face 19 of the main body 17 of the nut 15. The specific key receiving incision 23 is located in end face 22 of the main body 17 and requires the specific complementary key such as 6, 11 to be inserted in order that the nut may be rotated to effect tightening or loosening. A washer 16 of larger external diameter than the main body 17 of nut 15 fits over the shank 18 of the nut 15 and is retained by a small lip 24 at the end of the shank 18 of nut 15. In the assembled state, the washer 16 may rotate freely around the shank 18 of nut 15. FIG. 5 illustrates how the washer 16 has an internal diameter 25 which fits over the shank 18 of the nut 15 and an internal diameter 26 which accommodates the lip 24 of the nut 15 such that the washer is retained. The end of the washer 16 furthest from the main body 17 of the nut 15 has a raised annular ridge 27 which is knurled to oppose rotation against a flush face as the nut 15 is tightened. FIG. 6 illustrates how the nut 15 contains a threaded bore running through part of its length from end face 21 of the shank 18 of nut 15 such that the nut may be tightened onto a complementary threaded shank such as a threaded bolt or the threaded axle of a bicycle hub.

Figure 7:
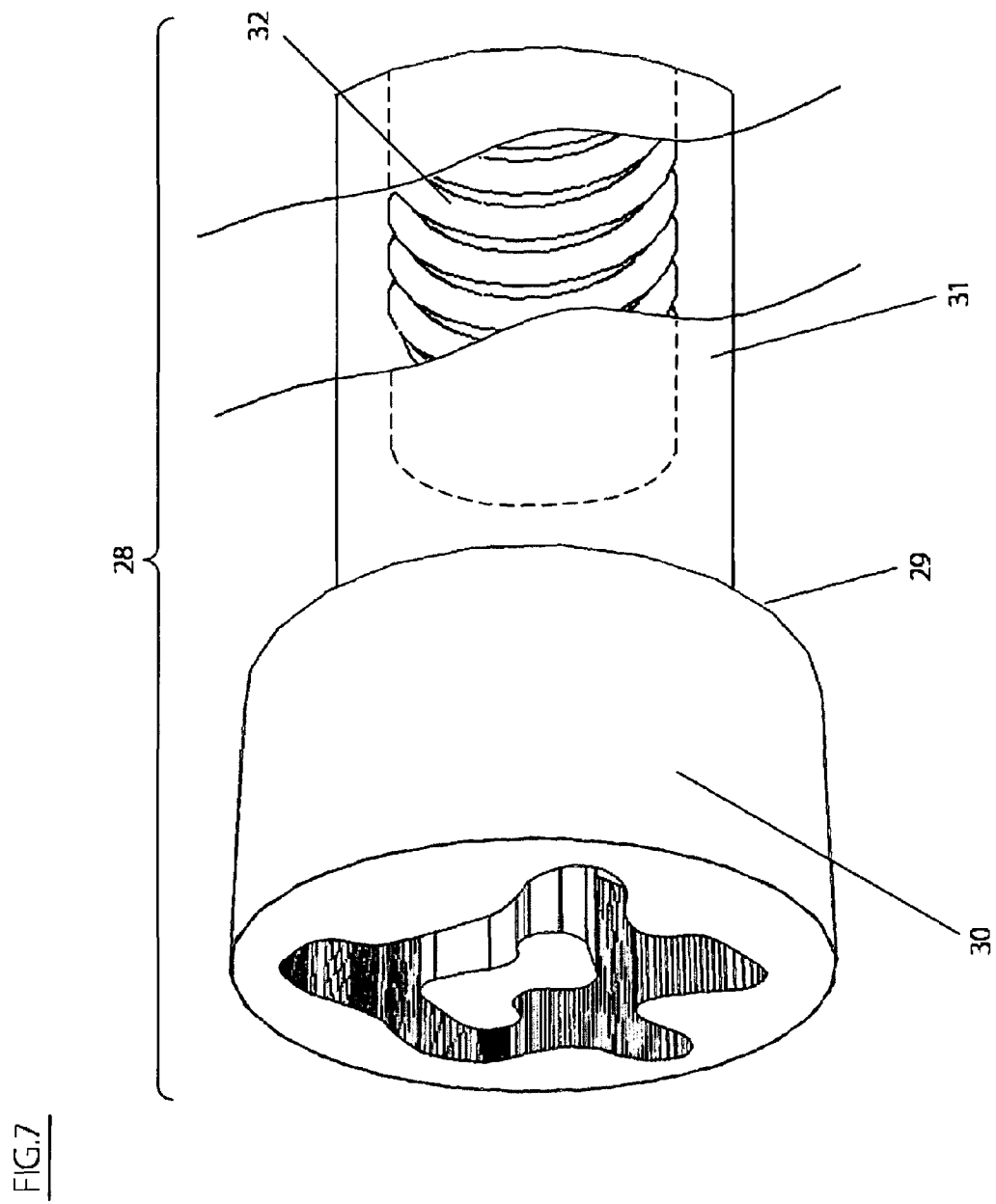
FIG. 7 is a perspective view of a fourth embodiment of a tamper-proof fastener according to the present invention which requires the same specific complementary key as the fastener shown in previous illustrations.

FIG. 7 illustrates another embodiment in which the fastener 28 is similar to a fastener 1 or 2 in all respects other than instead of a threaded shank extending away from end face 29 of the main body 30 a cylindrical body 31 of smaller diameter than the main body 30 extends away from end face 29 and contains a threaded bore 32 through part of its length to receive a complementary threaded shank. For example, such an embodiment may be used to secure the bolt used to fasten a brake assembly on standard road bike.

Figure 8:
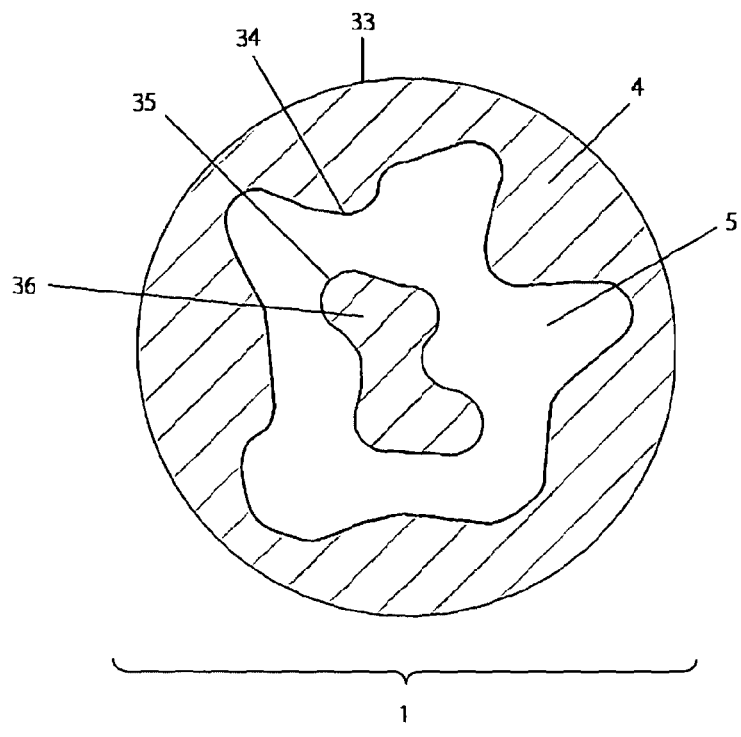
FIGS. 8, 9 are top plan views of the fastener of FIG. 1.
Figure 9:
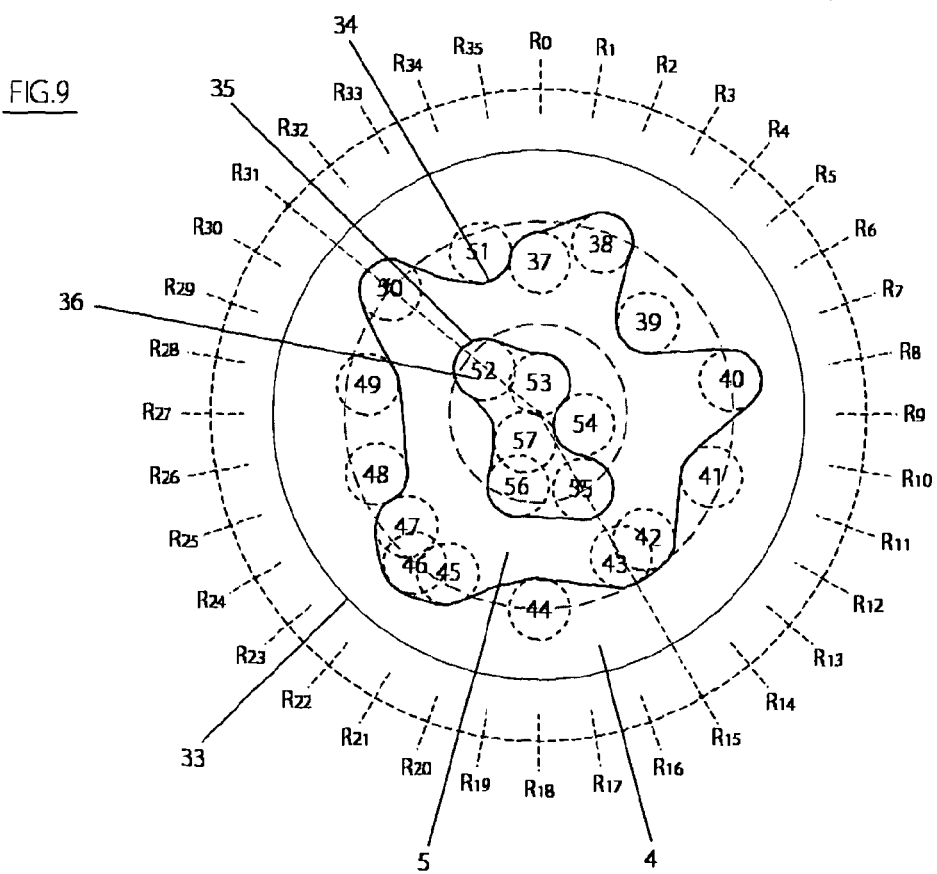

FIGS. 8, 9 illustrate an embodiment for a single instance of a key receiving channel 5 incised into the end face 4 of a security fastener such as 1 and the illustrations are designed to elucidate how a great number of permutations for unique key possibilities can be generated using CNC machining. It is worth noting here that due to the stresses involved in the machining and the requirement that the forms created for the key receiving channels be resilient, materials such as stainless steel and titanium are most appropriate for the construction of the fasteners with material such as spring steel with a subsequent heat treatment being appropriate for construction of the key. FIGS. 8, 9 are plan views of the end face 4 of a fastener such as 1. The key receiving channel 5 incised into end face 4 illustrates a single possibility of which an extremely high number of alternate possibilities exist. It will be appreciated that for the plurality of fasteners used to secure components on the bicycle of a single individual, the specific complementary key which exactly fits the key receiving channel in the fastener used in the example will likewise fit the plurality of fasteners on the single bicycle. It will also be appreciated that the limited examples of key receiving channels in the description of embodiments are merely examples of an extremely large number of possible channel arrangements.

In order for a single user to be provided with a plurality of security fasteners a database containing the channel profiles generated for that user is maintained. Therefore, when a user first requires a security fastener, a plurality of profiles are generated and associated with that user. When the user requires a further batch of security fasteners, the database is accessed (potentially requiring a secure log-in by the user) and the same profiles are then used for the further security fasteners. This enables a single user to be provided with a plurality of fasteners at a plurality of points in time that only require a single key. Therefore, the user may only require a single key for all components on his/her bicycle or the like.

In FIGS. 8, 9 the end face 4 has an outer periphery 33 which is the smooth outer surface of the main body 2 of the security fastener 1. The specific key receiving channel 5 incised into end face 4 has an outer periphery 34 and an inner periphery 35 which are the peripheral walls of the key receiving channel 5. The shapes of the inner periphery 35 and outer periphery 34 define the form required of the male member 7 of the specific complementary key 6, 11 required to actuate the fastener 1. The shape formed by inner periphery 35 creates the appearance of an 'island' 36 in the end face 4 of the fastener 1. The shape formed by the outer periphery 34 will be different to that formed by the inner periphery 35 in their fixed position. This implies that the width of the specific key receiving channel 5 will not be constant throughout its entirety. For any combination of shapes of the inner periphery 35 and the outer periphery 34 there exist an extremely large number of permutations due to the possibility for changes in relative position through radial rotation and also through offset of the 'island' 36 relative to the outer peripheral wall 34 along any axis. Possibilities for individual shapes are very large as the form of either of the peripheral walls 34, 35 may consist of any number of linear sides from 3 upwards or be of continuous curvilinear form or any combination in between as long as the combined forms provide adequate driving surfaces for the necessary torque to be generated for the fastener's primary function as a fastener. However, the number of different possibilities for the key receiving channel 5 are bound by the constraints mentioned earlier, namely the minimum diameter of the cutting tool and the minimum material thickness of the fastener and the key.

FIG. 9 illustrates how the specific key receiving channel depicted in FIG. 8 can be formed within these constraints. Dashed circles 37 to 57 represent the cross-sectional area of the minimum diameter cutting tool. A series of these circles is generated such that on a radial axis from the centre of end face 4 the outermost point of any of the circles may not be less than a fixed distance from the outer periphery 33 of the main body 2 of the fastener 1. That is to say that there is a constraint on the maximum radial distance from the centre of end face 4 for the location of the outer peripheral wall 34 of the key receiving channel 5. This ensures that a minimum amount of material is preserved to guarantee the integrity of the main body 2 under torque. The location of each of the circles can be defined using co-ordinates which are the radial location relative to a main axis R0 to R18 and the radial distance from the fastener's longitudinal axis i.e. the centre of end face 4 in the diagram. So for example, the centre of the circle 50 lies on the intersection of the radial line R31 and the circumference of the circle C2 and the centre of circle 55 lies on the intersection of radial line R15 and the circle C1. A shape which defines the outer peripheral wall 34 of the incised key receiving channel 5 is then formed by joining the insides and outsides of circles 37 to 51 to create a shape which provides sufficient drive surfaces to ensure that the necessary torque can be generated when force is applied. After a channel, the width of the minimum diameter cutting tool, has been incised into the end face 4 of the fastener 1 then the 'island' 36 is formed by removing material to create the form created through joining insides and outsides of circles 52 to 57.

It will be understood that there is no constraint on the number of circles used in defining the forms of the outer and inner peripheral walls 34, 35 of the key receiving channel 5 but rather that these circles are used in design merely to ensure that the form of any individual key channel is able to be produced by a CNC machine AND that likewise, the male member 7 of the specific complementary key 6, 11 can also be machined using the same cutting tool. It will also be appreciated by those skilled in the art that such forms for a key receiving channel may also be produced by electrical discharge machining and that the reference to the use of a CNC machining process is to illustrate that such an embodiment may be produced using existing technology and should in no way be understood to limit the scope of the invention to a design which is produced by using 'location circles' to create a form for the walls of the key receiving channel as it is entirely possible under the alternative machining process to produce forms which are not subject to the constraint of a tool with a minimum cutting diameter and which may vary in practically infinite ways. The use of 'location circles' is merely to facilitate comprehension of how a single embodiment may be produced under one existing manufacturing process. Alternative manufacturing processes may be utilised, for example:

the fasteners and corresponding keys may be conventionally turned, on a lathe or the like, and then milled to create the channel

- a single CNC machine or the like may be used to create each fastener in one machining operation
- the channel may be formed using electrical discharge machining
- the fastener may be formed using rapid prototyping/manufacturing techniques, in the general class of additive manufacturing such as electron beam melting or selective laser sintering. In this example, more complex three-dimensional channels may be formed, with corresponding keys.

While FIG. 9 elucidates how a great many shapes for the inner and outer peripheral walls of a key receiving channel may be created, FIGS. 10, 11, 12 illustrate how a great many permutations of key receiving channel exist for the same combination of shapes of inner and outer peripheral walls through changes in relative location through rotational shifts and offsets along radial axes. Each embodiment of FIGS. 10, 11, 12 has a different key receiving channel. In FIG. 10 the fastener 1 has the end face 4 of the main body 2 incised with the key receiving channel 49. In this illustration the shape formed by the outer peripheral wall 50 of the incision 49 has been reduced to the simplest form possible i.e. that of an equilateral triangle. Similarly, the 'island' 52 formed by the inner peripheral wall 51 of the key receiving channel 49 takes the simple form of an isosceles triangle the longitudinal axis of which is aligned with the radial axis R0 to R18 of the end face 4 of the fastener 1 with the 'island' 52 located centrally in end face 4 the centre of which is depicted by the intersection of radial axes R0 to R18 and R27 to R9.

FIG. 11 illustrates how this combination of very simple shapes can generate further possibilities for specific keys through a change in relative position between the shapes formed by the inner and outer peripheral walls of the key receiving channel with the 'island' 52' being the same as if the 'island' 52 in FIG. 10 were rotated clockwise through 30 degrees relative to the shape formed by the outer peripheral wall 50 of key receiving channel 49' so that the longitudinal axis of the 'island' 52' is R3 to R21. FIG. 11 illustrates how further permutations for possibilities for key receiving channels may be generated using the same combination of shapes for the inner and outer peripheral walls of the key receiving channel by changing the relative position of the 'island' by offsetting its centre along a radial axis.

In FIG. 12 the position of 'island' 52" relative to the outer peripheral wall 50 of key receiving channel 49" is the same as if the 'island' 52' in FIG. 11 were shifted by distance dX along the radial axis which runs through R9 and R27. It will be appreciated that the ability to generate such a wide variety of shapes for the outer and inner peripheral walls of the key receiving channel in combination with the possibilities for changing their position relative to each other through rotational and/or radial shifts gives rise to an extremely large number of possibilities for unique specific keys which is highly desirable from a security perspective as it eliminates the possibility that an individual can collect keys which actuate the fasteners of a plurality of bicycles.

Figure 13:
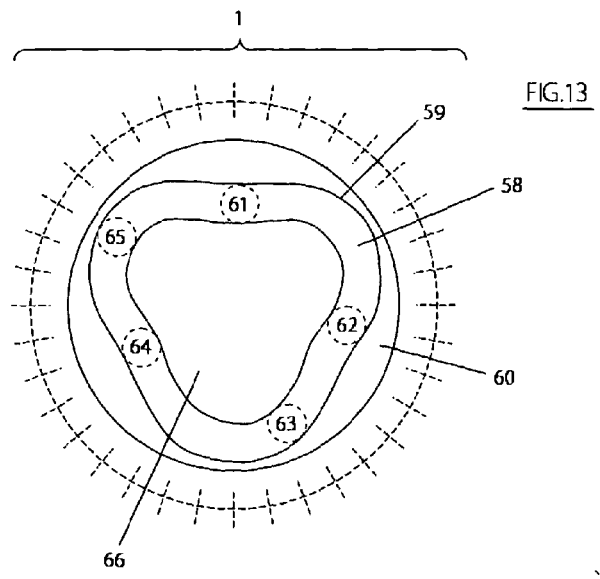
Figure 14:
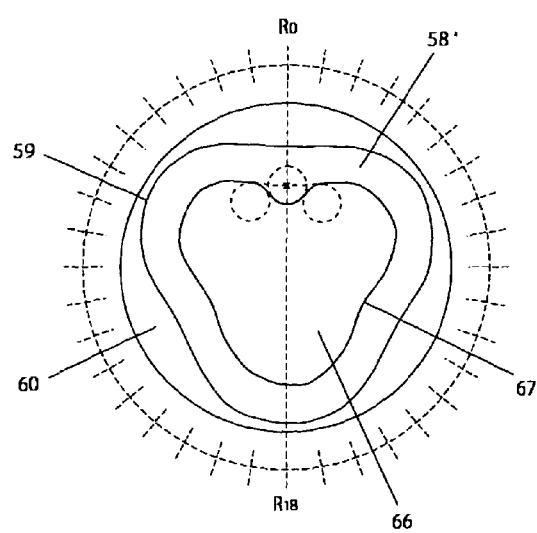
Figure 15:
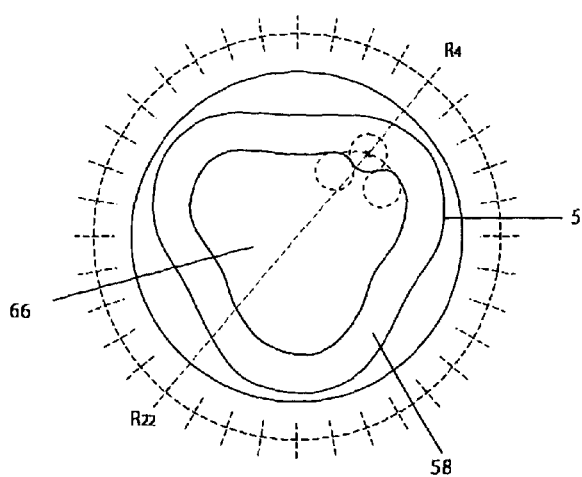

FIGS. 13, 14, 15 illustrate how another series preferred embodiments may be generated in a relatively efficient manner of production using CNC machines. The key receiving channel 58 which defines the shape of the outer peripheral wall 59 is first incised into the end face 60 of a fastener such as 1. The series of circles 61 to 65 represent the cross sectional area of the minimum diameter cutting tool. Incision of the key receiving channel 58 creates the 'island' 66 which is then modified further by simply removing a small section of material as illustrated in FIG. 14. In FIG. 14 the material is removed at the intersection of radial axis R0 to R18 of end face 60 and the peripheral wall 67 of the 'island' 66 to form the modified 'island' 66'. By marginally altering the radial location of the point at which material is removed from the 'island' 66 many permutations for specific key receiving channels can be extracted for any single form for the outer peripheral wall 59 without a high additional degree of complexity for creating the form of the inner peripheral wall which defines the shape of the central 'island'. This is illustrated in FIG. 15 in which the key receiving channel 58" has the same outer peripheral wall 59 as the embodiments depicted in FIGS. 13, 14 but the material has been removed from the 'island' 66 at a radial location on axis R4 to R22 to form 'island' 66". The specific complementary keys for the key receiving channels 58' and 58" are not interchangeable. Thus it will be appreciated that a high degree of security can be achieved through creating an extremely large number of unique keys without unnecessarily large increases in complexity of design.

Figure 16:
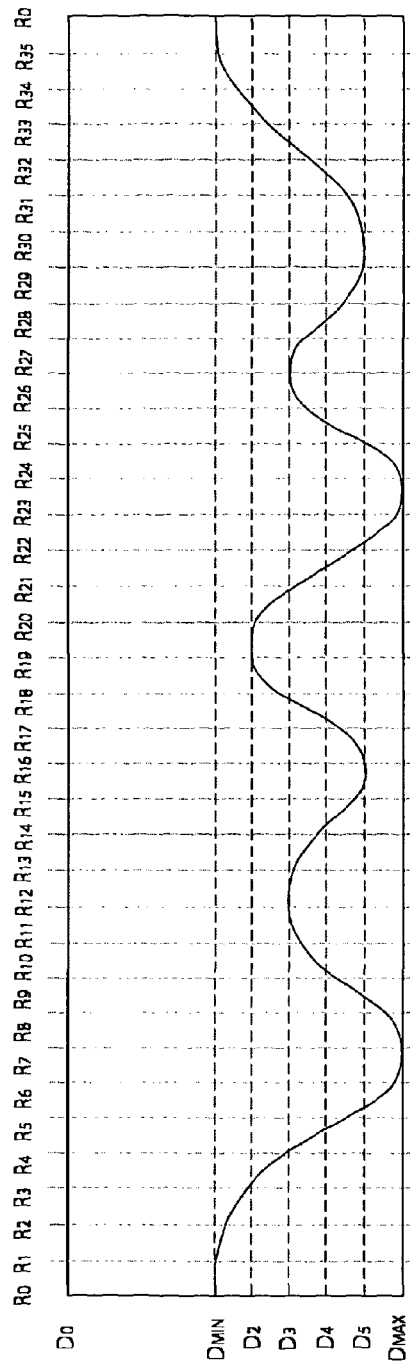
FIG. 16 is a side elevation view of a single embodiment of the floor of the key receiving channel in a tamper-proof fastener such as in FIG. 1 viewed as if the 360 degree rotation were rolled out flat.
Figure 17:
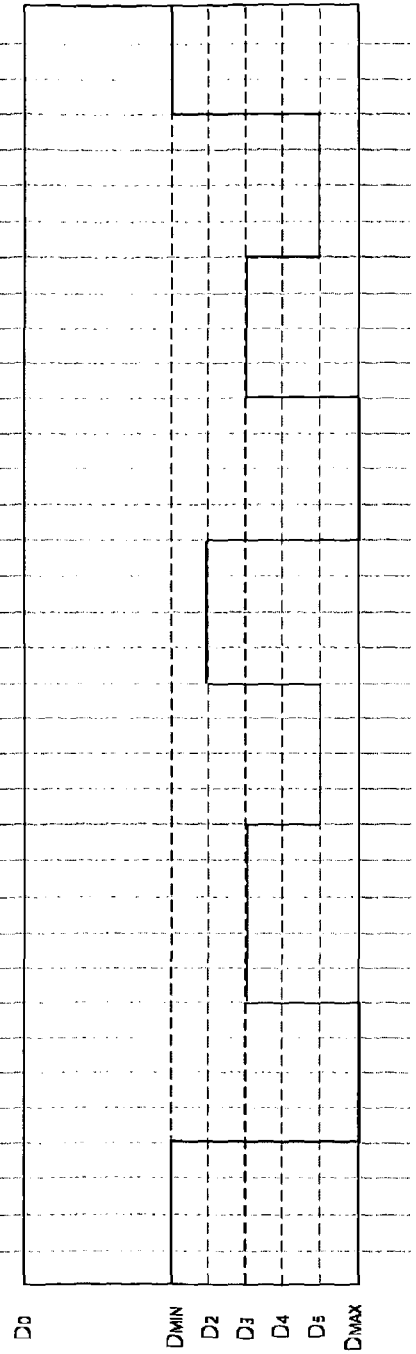
FIG. 17 is a side elevation view of a second instance of the floor of the key receiving channel in a tamper-proof fastener such as in FIG. 1 viewed as if the 360 degree rotation were rolled out flat.

FIGS. 16, 17 illustrate how even further permutations may be achieved by effectively creating a requirement for the specific complementary key to be specifically complementary to the key receiving channel in a third dimension i.e. parallel to the longitudinal axis of the fastener. This may be understood quite simply as the floor of the key receiving channel being of inconsistent depth. FIG. 16 illustrates the profile of one embodiment of the floor of the key receiving channel through a 360 degree rotation. The vertical lines R0 to R35 correspond to the radial lines R0 to R35 at 10 degree intervals as shown in FIG. 9. At any radial point, the floor of the key receiving channel may have a depth between Dmin and Dmax a series of depths being marked at intervals by horizontal lines in the illustration. D0 is the level of the end face of the fastener, Dmin the minimum depth that a point on the floor of the key receiving channel may take and Dmax the maximum depth that said floor may take. From FIG. 16 it can be seen for example, that on the radial line R7 said floor is at its defined maximum depth while on radial line R11 it has a depth of D3 and on radial line R18 it has a depth D2 and so on. Alternatively, the curved profile shown in FIG. 16 can be manufactured using a linear interpolation of the curved surface. Thus, the curved profile would comprise a plurality of linear sections at varying gradient as compared to the bottom of the channel. The number of interpolations used may be varied depending on the level of manufacturing complexity that can be handled.

FIG. 17 illustrates how the changing depth of the floor/bottom of the key receiving channel may be abrupt creating a 'step-like' appearance of castellations. Thus, between any two points along the floor of the key receiving channel, the rate of change in the gradient of the floor introduces another degree of freedom which allows an even greater number of permutations for possibilities of specific key receiving channel for a combination of any two shapes of outer and inner peripheral walls of the channel. A criticism of this approach would be that any key which fitted the same combination of inner and outer peripheral walls between D0 and Dmin would be able to actuate a plurality of fasteners otherwise designed to only accept a different specific complementary key. However, by setting Dmin to an appropriate level (for example, such that Dmax-Dmin is a substantial portion of the depth of the channel) then under force it is not possible for an illegitimate key with the same plan view to remain seated and successfully rotate the fastener.

In the example where the bottom of the channel has a profile, the channel may have a constant width (i.e. the shape of the outer wall and the inner wall profile is the same).

A few specific examples will now be described of how the key and a fastener may be used.

Figure 18:
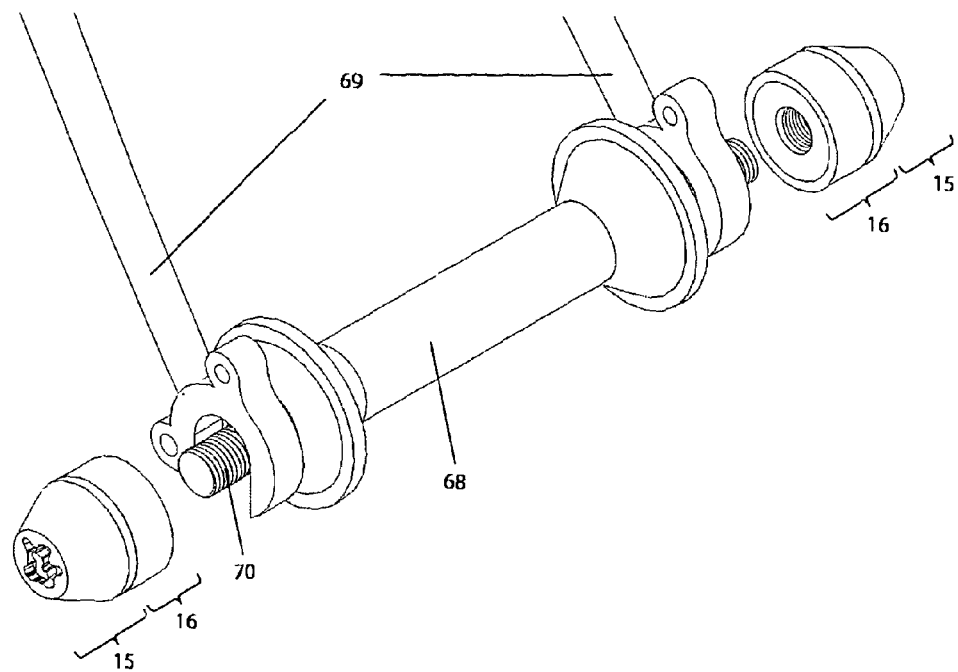
FIG. 18 is a perspective view of the fastener of FIG. 4 being used to attach a wheel hub assembly of a bicycle to the bicycle forks.

FIG. 18 illustrates how a pair of fasteners comprising of the nut 15 and washer 16 may be used to secure a bicycle wheel to the bicycle forks 69 by tightening them onto the threaded axle 70 of the wheel hub 68 which lies at the centre of the wheel. Typically, such a hub is secured to the forks using hexagonal nuts which are tightened and removed by a common wrench but by using the fastening assembly as described in FIGS. 4, 5, 6 the bicycle wheel may be secured to the forks such that it can only be removed by the owner of a specific complementary key such as 6, 11.

Figure 19:
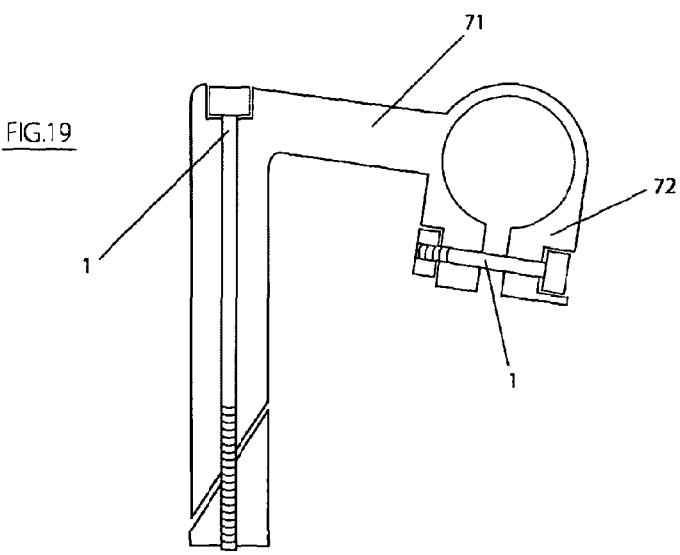
FIG. 19 is a side cross-sectional elevation of the fastener of FIG. 1 being used to secure a handlebar stem to the bicycle frame and to secure the handlebar clamp.

FIG. 19 illustrates how two fasteners 1 may be used to secure a handlebar stem 71 to the bicycle frame and to tighten the handlebar clamp 72 so that the handlebars may not be removed.

FIGS. 20, 21 illustrate how a fastener 1 may be used to secure the saddle 73 by tightening the saddle clamp 74 which is at the top end of the seat pin 75 with the bottom end of the seat pin inserted into the bicycle frame and secured using a seatpost clamp 76 which is fastened using security fastener 13.

Figure 22:
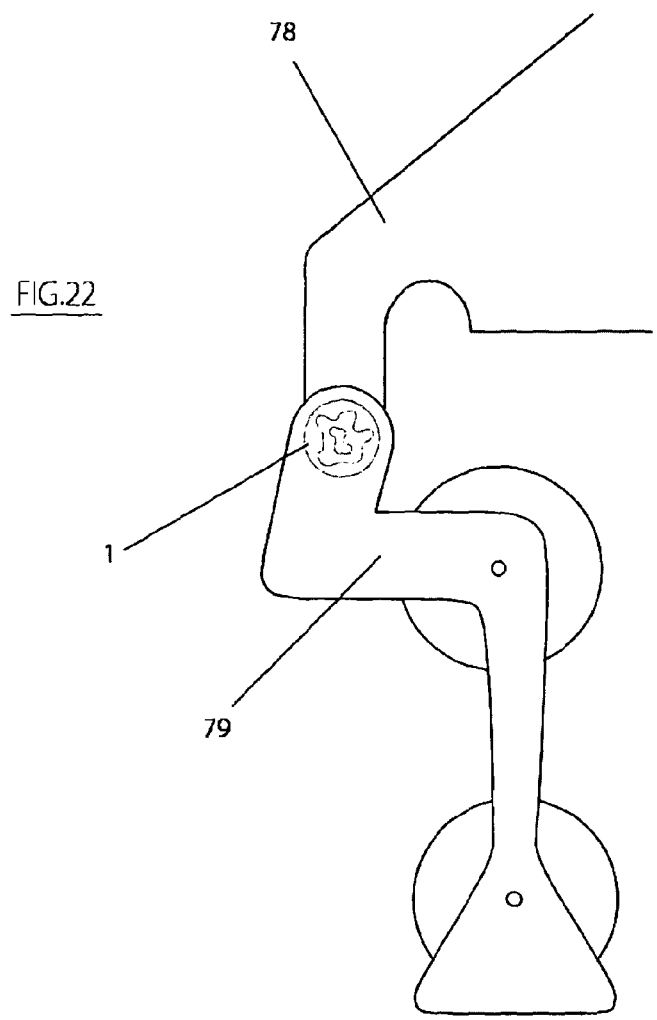
FIG. 22 is a side elevation view of a fastener similar to that of FIG. 1 securing the rear derailleur mechanism to the bicycle frame.
Figure 23:
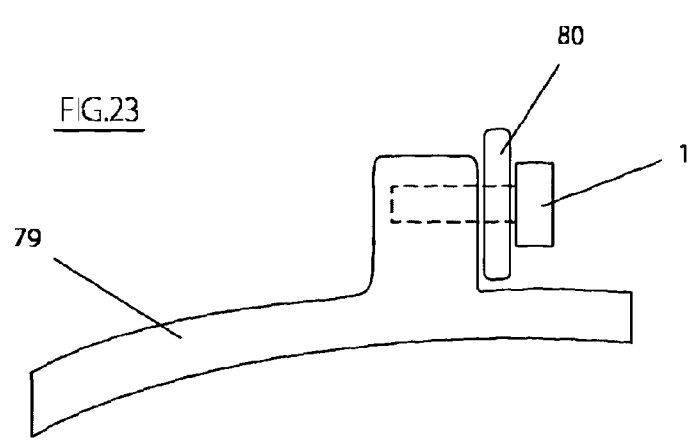
FIG. 23 is a side elevation view of the fastener of FIG. 1 securing the front derailleur mechanism to the bicycle frame.

FIG. 22 illustrates how a fastener 1 may be used to secure the rear derailleur gear shifting mechanism 77 to the bicycle frame 78. Similarly, FIG. 23 shows a fastener 1 securing the front derailleur gear shifting mechanism 79 to a mount 80 which is brazed on to the bicycle frame.

Figure 24:
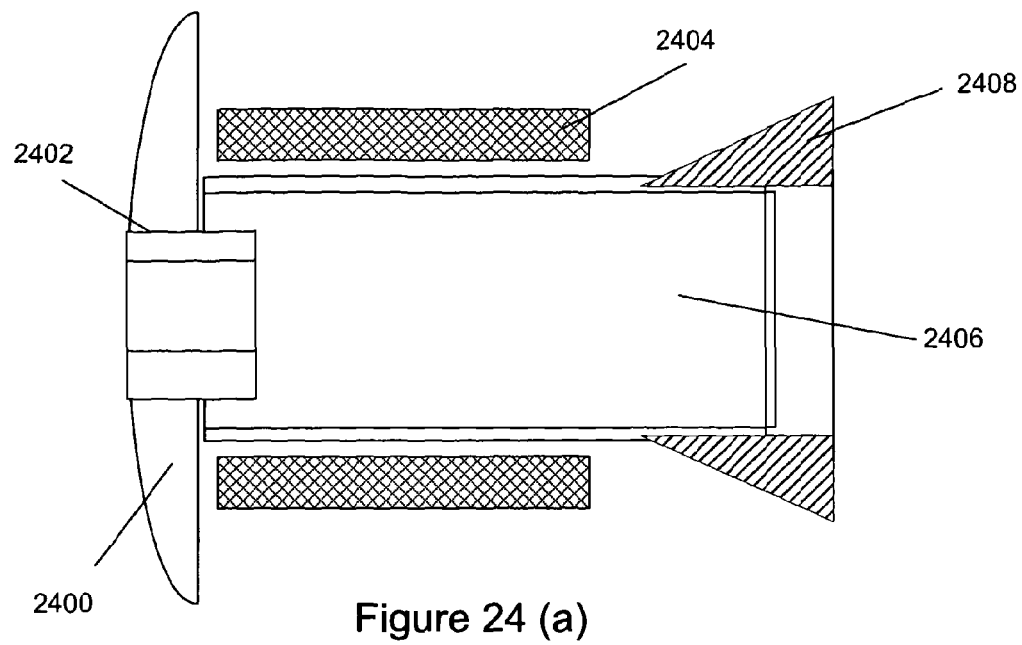
FIG. 24 show a side elevation of security fastener compression fittings.
Figure 24:
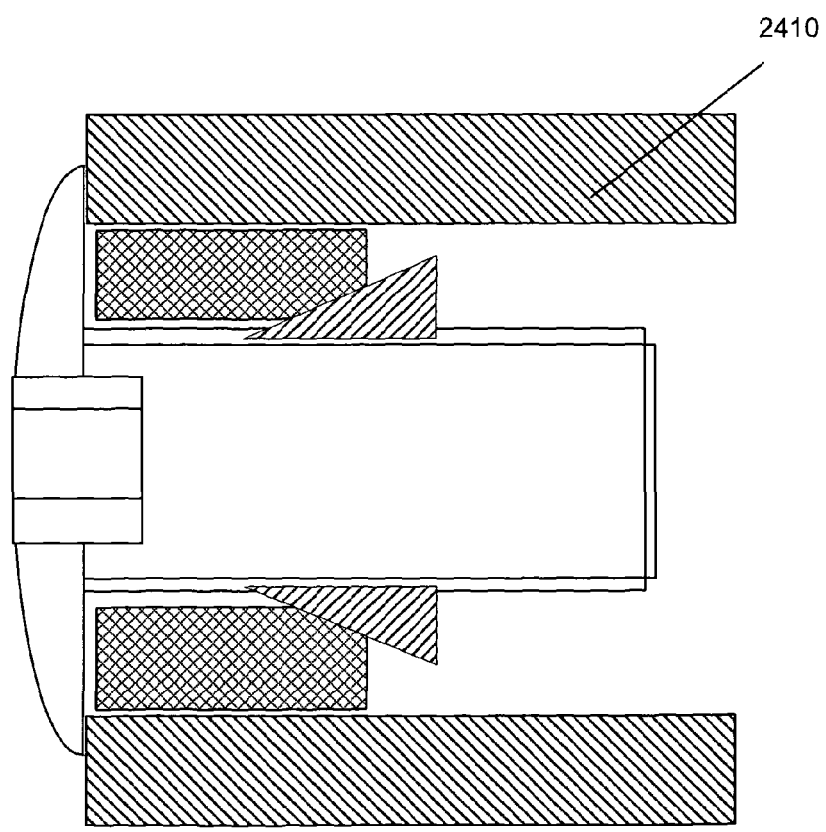

FIG. 24 show a cross section of a security compression fastener that enables components with hollow shafts, such as bicycle pedals and crankshafts to be secured to a bicycle. The security fastener 2400 comprises a channel 2402 as aforementioned that enables the security fastener to be keyed to a specific user. The collar 2404 fits around the threaded shaft 2406, and a tapered nut 2408 or the like is threaded onto the threaded shaft. As can be seen on FIG. 24 (b) when the threaded nut 2408 is threaded on to the shaft 2406, the taper is drawn in to the collar. The collar may be a flexible cylinder, such as rubber, or a split cylinder, and the action of drawing the tapered nut in to the collar forces the collar to expand. FIG. 24 (b) shows the security fastener inserted into a hollow shaft 2410, and the collared being compressed such that it engages with the shaft. In specific examples, the hollow shaft may be a bicycle pedal, and in this case the head of the security fastener would locate against the inside of the crank arm. The direction of the threaded shaft would be such that attempting to remove the pedal would draw the tapered nut further onto the shaft, and thus would increase the force exerted by the collar on the inside of the hollow shaft of the pedal. Thus, the pedal would be secured to the crank arm, and could only be removed once the security compression fastener was removed. A similar system could be used for a crankset, or the like.

Figure 25:
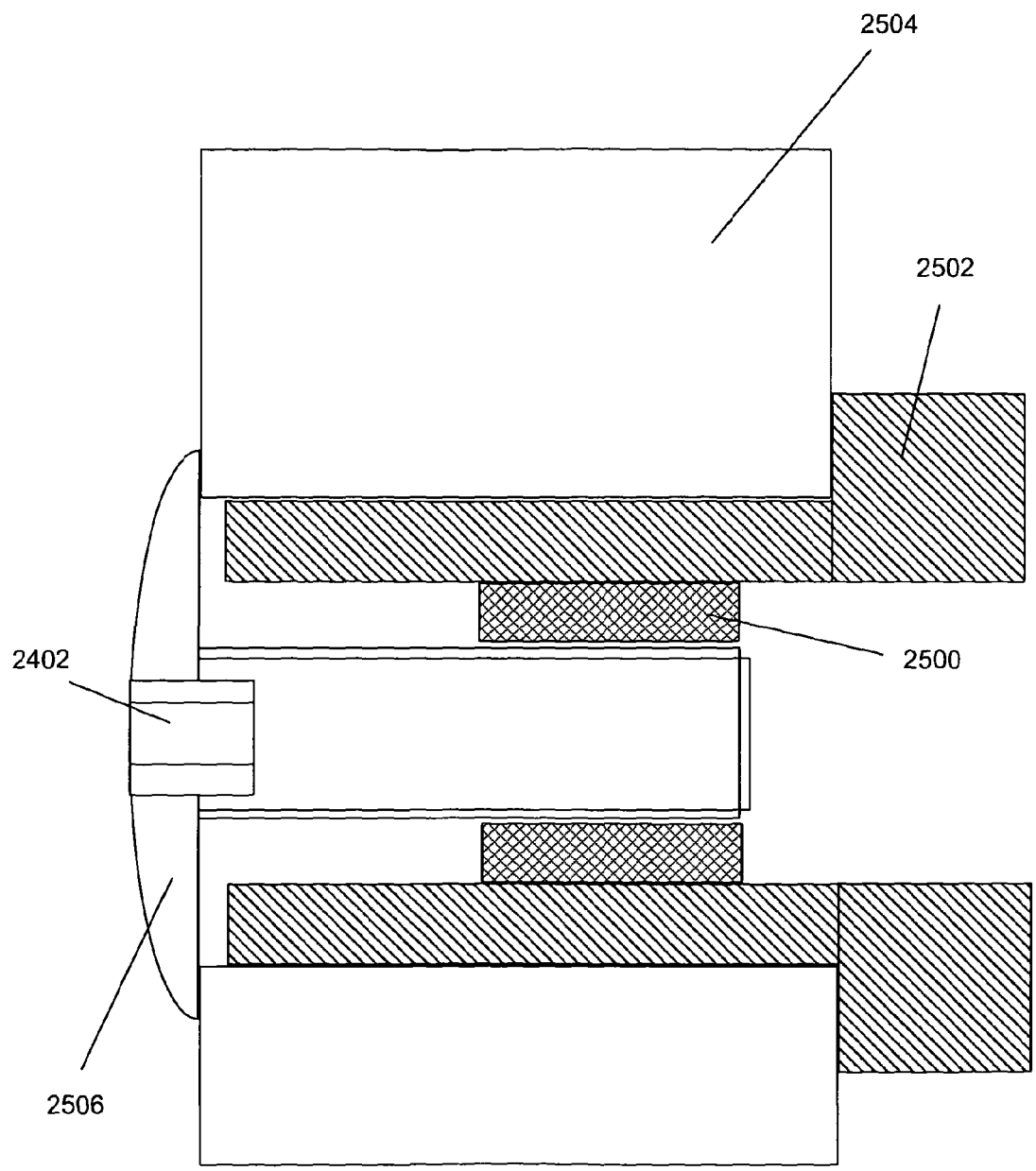
FIG. 25 shows a side elevation of a security fastener adapted to prevent removal of a bicycle pedal.
Figure 26:
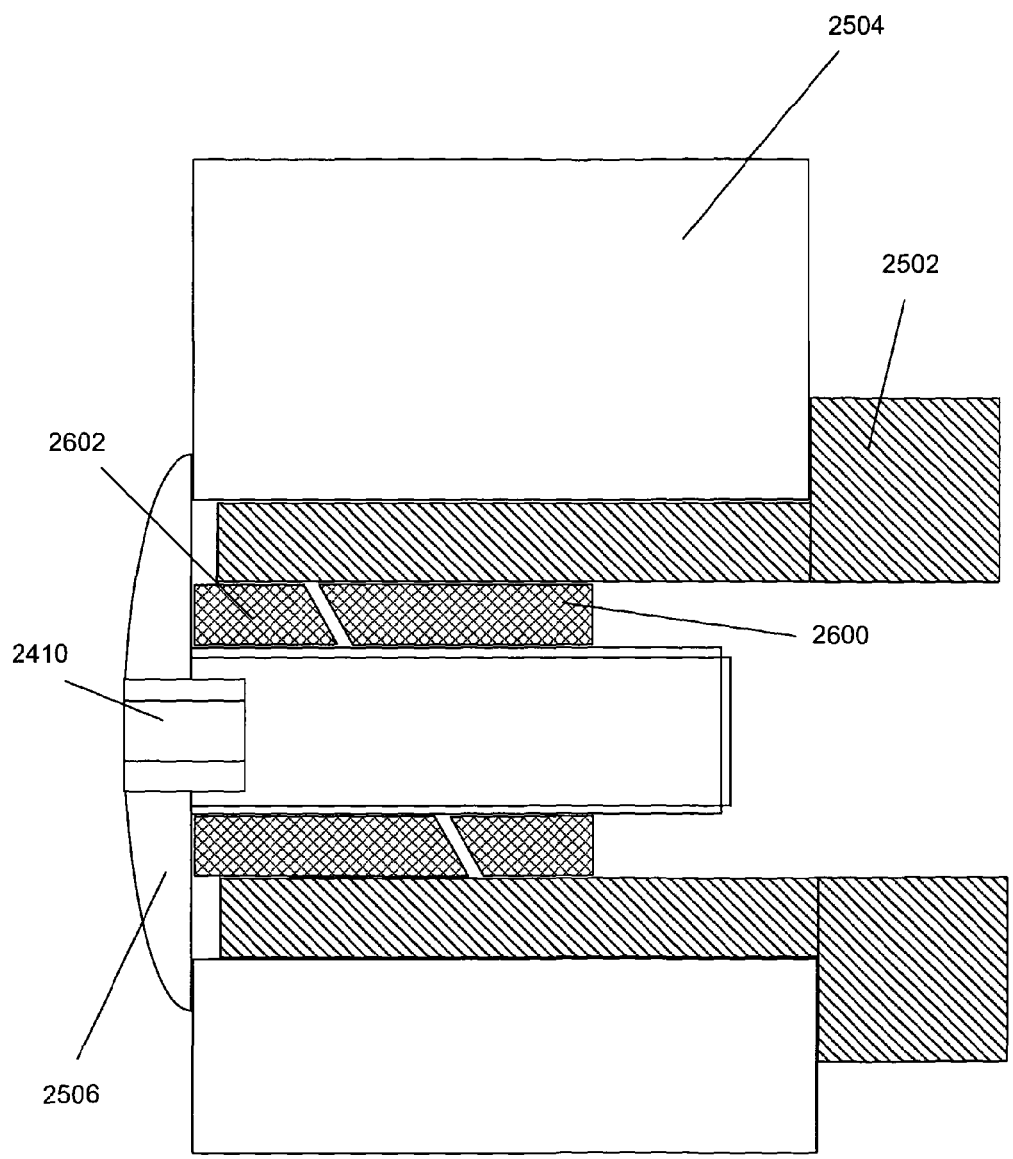
FIG. 26 shows a further example of a security fastener adapted to prevent removal of a bicycle pedal.

FIGS. 25 and 26 show a cross-section of further security fastener used to secure components that have a hollow shaft of some variety. In both of these examples, the component with a hollow shaft as a bicycle pedal, secured to a crank arm of a bicycle. However, other applications of such a security fastener are possible. FIG. 25 shows a knurled nut 2500 press fitted into the hollow shaft of a pedal 2502. Once the pedal is tightened onto the crank arm 2504, the security fastener 2506 is fitted into the knurled nut 2500 thus securing the pedal to the crank arm. As described above, the direction of the security fastener thread is such that attempting to remove the pedal from the crank arm acts to tighten the security fastener, and thereby prevents removal of the pedal without first removing the security fastener.

FIG. 26 is a similar arrangement to FIGS. 24 and 25, however, a set of knurled wedges 2600, 2602 is utilised instead of the split collar or knurled nut. In this example, as the security fastener is drawn into the knurled wedge 2600, the wedge 2602 is forced against the inner surface of the hollow shaft of the pedal securing it in place.

Figure 27:
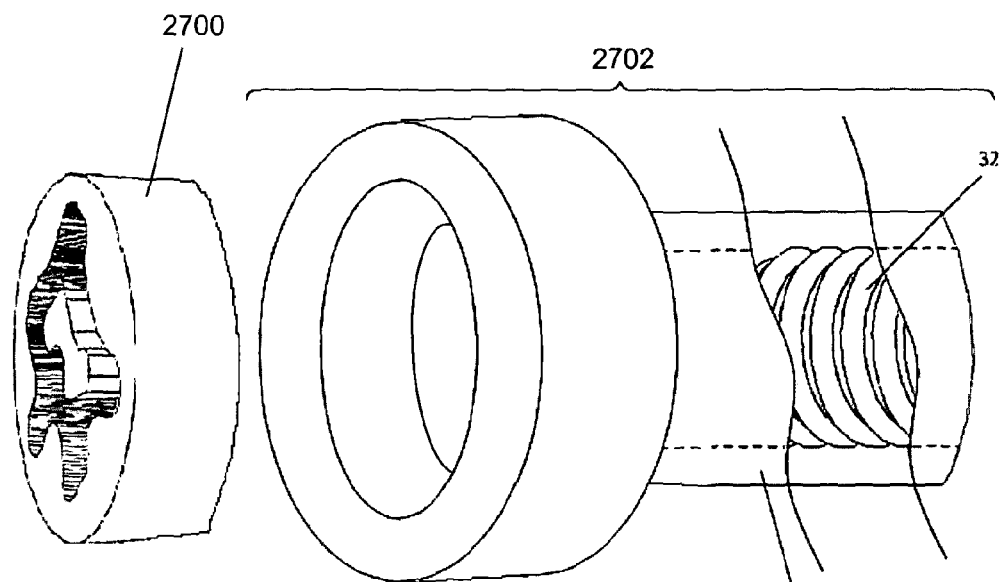
FIG. 27 show alternative examples of the fastener.
Figure 27:
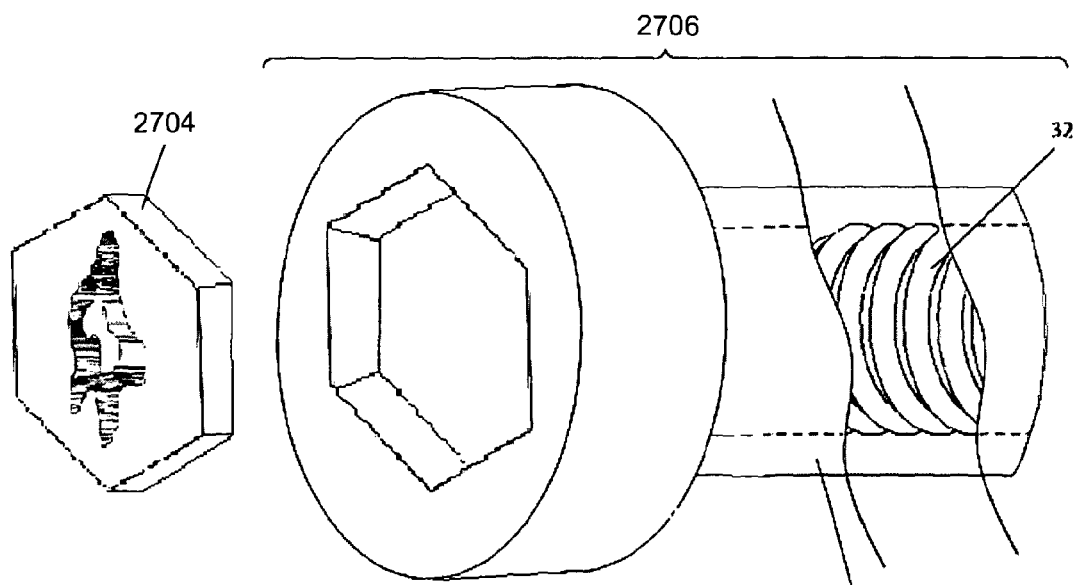

FIG. 27 show alternative examples of the fastener in which the channel is incised within an insert that is then inserted within a blank fastener and, as in the case of FIG. 27 (a) the insert 2700 is bonded to the blank fastener 2702, or as in the case of FIG. 27 (b) the insert 2704 may be press fit within the blank fastener 2706, and/or bonded. In both cases, the insert is permanently fixed within the fastener and may not be removed. In this example, the manufacturing cost and complexity may be reduced as the blank fasteners may be manufactured in bulk.

In further examples of the security fastener, the channel does not have walls that are orthogonal to the face of the head of the security fastener. In this example, the channel walls taper, or form some other non-linear profile from the face of the head of the security fastener to the bottom of the channel. Alternatively, only a portion of the channel walls may be tapered. This may further increase the number of permutations of keyed channel that are available.

In a yet further example relating to the security fasteners with a profiled bottom to the channel, a relatively small groove is provided around the external (or internal) circumference of the complimentary key. The groove is located such that when it is inserted into a security fastener with a non-matching bottom profile the groove is exposed above the surface of the security fastener. Therefore, the torque that can be applied to the security fastener via the key is reduced since with a reduced material thickness at the location of the groove the key will fail before enough torque can be transferred to the security fastener for it to be removed. Using such a key in an authorised manner, i.e. in conjunction with a fully matching security fastener will not reduce the torque that can be transferred since the groove would be within the channel.

Further Aspects, Modifications and Alternatives

Location Marks

In some embodiments, location marks may be incorporated on key and slot to facilitate quick engagement. These location marks may comprise, for example, a dot on the face of the fastener head and a small complementary groove in the side of the key body. Alternatively, other markers may be used to indicate the appropriate relative positioning of key and slot.

Further Aspects of the Fastener Design

FIGS. 28 to 32 show further aspects of the fastener design, and in particular the use and design of washers and shrouds. For example:

The 'grip washer' which contacts the bicycle frame and is retained by the frustoconical track nut may taper (in side elevation), the angle of the taper being at least that of the nut. This is to address a potential problem with the use of the washer having a cylindrical section wherein it may be possible to loosen a nut using a special tool to grip the washer and rotate the nut through friction.

The grip washer, irrespective of cross sectional form, may include one or more 'dogs' which protrude beyond the knurled surface (contact face against frame) such that the dog(s) impede the ability of the washer to rotate. For example, the dog(s) may locate in the fork ends/dropouts and prevent the washer from rotating. Although more complex to manufacture, this may provide further protection if the simpler method of tapering the washer proves insufficient. Both features may also be combined.

Any fasteners may be wholly or partially protected by a (preferably tapered) shroud. This shroud may be fixed or freely rotating and/or may have one or more dogs which impede its ability to rotate. If fixed, the shroud may have a knurled contact surface.

Figure 28:
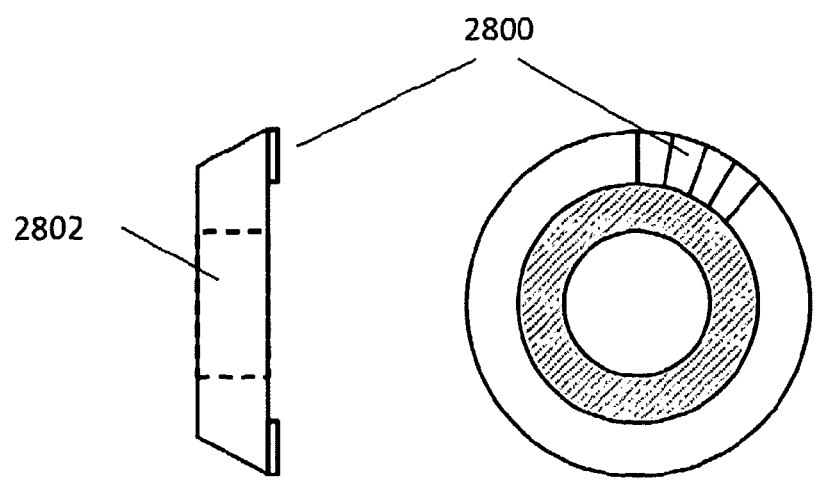
FIGS. 28 to 32 show further aspects of the fastener design.

FIG. 28 shows a tapered grip washer in side elevation and plan views showing knurled face 2800 and through hole 2802.

Figure 29:
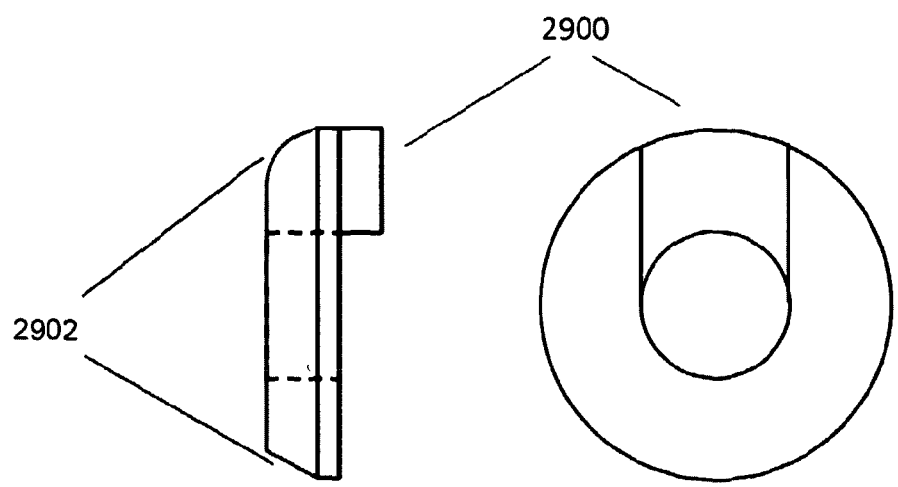

FIG. 29 shows a washer with a 'dog' 2900 to prevent rotation. Profile 2902 may be radiused, tapered, cylindrical or a combination. The underside or contact face may also be knurled.

Figure 30:
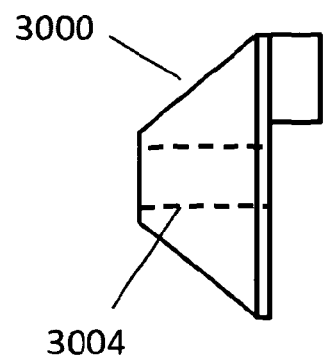

FIG. 30 shows a conical grip nut with 'dogs', suitable for securing a non-encoded end of a fastener in certain instances such as for replacing a quick-release wheel skewer with a very long threaded fastener. Tapped through-hole 3004 may alternatively be blind. Profile 3000 may be radiused, tapered, cylindrical or a combination.

Figure 31:
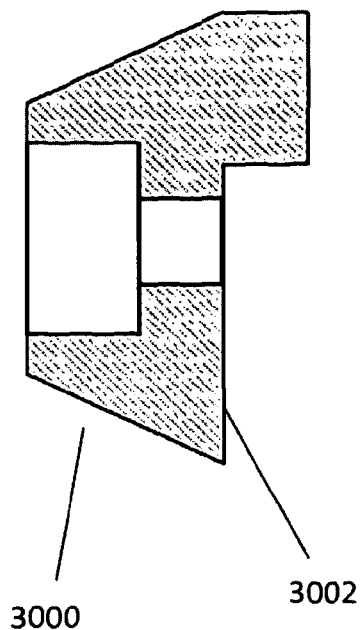

FIG. 31 shows in cross-section an example of a non-rotating shroud, illustrating how the bolt/female bolt may be accommodated and rotation prevented by means of one or more 'dogs' if the bolt were fixed to the shroud by crushing or bonding. Profile 3000 may be radiused, tapered, cylindrical or a combination. Contact surface 3002 may be knurled.

Figure 32:
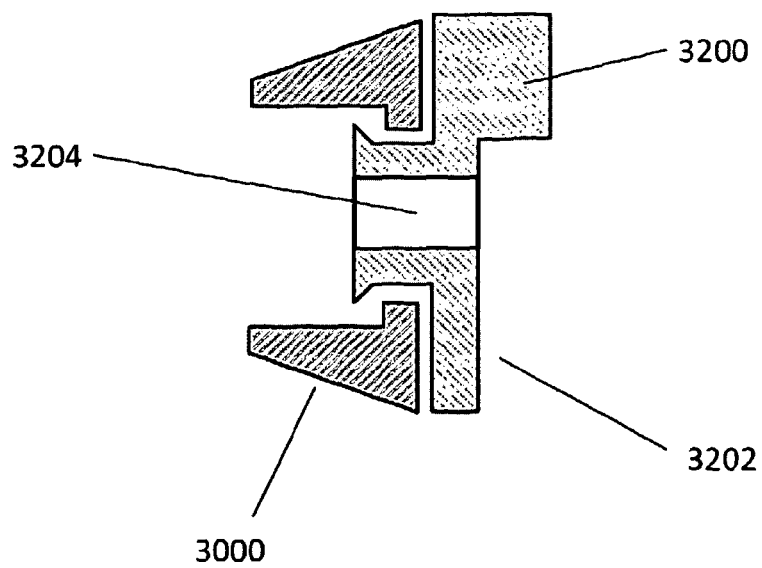

FIG. 32 shows in cross-section an example of a freely-rotating shroud, comprising a through-hole 3204 for accommodating the fastener. Profile 3000 may be radiused, tapered, cylindrical or a combination. Contact surface 3202 may be knurled. The shroud protects the head of the encoded fastener and is free to rotate around the retaining part. Optionally, one or more 'dogs' 3200 may be used to prevent rotation.

Any of these fasteners may exclude the 'dog(s)' and merely have a knurled contact face. The purpose of the 'dog' is to insert into the fork ends/dropouts (in the specific case of being used on a bicycle to retain a wheel) and this prevents rotation of the enclosed fastener through friction or a mechanical connection established between the parts.

Figure 33:
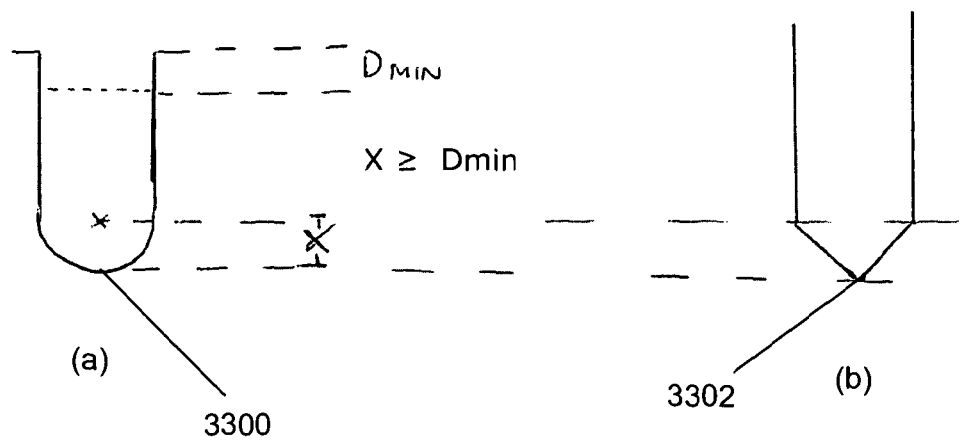
FIGS. 33 and 34 show further aspects of the key design.
Figure 34:
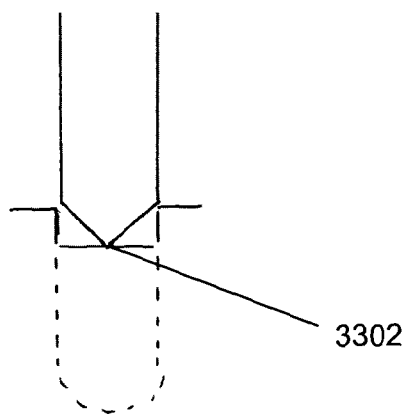

In some embodiments, aluminium parts are used to house the fasteners, specifically:
 an ahead stem top cap
 a seat post collar (which fully houses the fastener to prevent tampering)
 replacement faceplate/fingers for an ahead stem which accommodate the fasteners Further Aspects of the Key Design FIGS. 33 and 34 show further aspects of the key design, in particular a refinement intended to prevent the use of an unauthorised (although potentially ostensibly genuine) key to engage a fastener with the same plan view but with a different third dimension.

FIGS. 33 and 34 shows a key slot in cross section and the result of chamfering the key member such that when an authorised key is inserted into a non-reciprocal slot it is blocked by the obstruction at Dmin (Dmin being the representative of the shallowest point of the slot), and the only contact surface between key and slot will be angled so that sufficient torque to undo the fastener cannot be applied. In particular, this refinement involves:
 in profile, one or more 'features' that are a substantial proportion of the depth of said channel, such that a non-matching key cannot provide sufficient torque to remove the security fastener.
 any such individual feature may be formed with profiles of the channel floor where the gradient of the profile $dZ/dL$ (where L=channel length, Z=slot depth) may be between zero and infinity (i.e. flat to vertical)
 $dZ/dL$ is not necessarily constant but subject to its own rate of change i.e. $d2Z/d2L$ is important. Thus, the profile may range from being stepped to being 'rolling'.
 profile 'features' are not necessarily symmetrical
 multiple profile 'features' are not necessarily the same
 Radius X 3300 of the slot bottom accommodates the chamfered point 3302 of the key but with $X \geq Dmin$, when a key (unauthorised, but with the same plan view) is inserted it is obstructed by Dmin, the angular contact surface preventing torque being applied to undo the fastener.

Variants have the chamfering in a direction along the length (as in circumferentially) of the channel and/or across the width (as in radially) the length of the channel. Alternatives have the chamfering at a skew angle to the channel profiling.

Further refinements pertain specifically to the cross-section, in particular:
 The cross sections at any two points of the key are not necessarily the same
 The cross sections at any two points of the slot are not necessarily the same
 The cross section of an individual point in the slot and the inverse of the cross section of the complementary point of the key may differ such that it impedes the ability of an illegitimate key with the same (inverted) plan view as the slot of the fastener to apply torque
 The cross section itself may be a key feature i.e. a method of creating further key permutations such that the wall of the slot is not necessarily vertical and the gradient of the wall in cross-section may vary with height In a specific preferred embodiment, the above features in combination result in a key with the following features:
 two profile 'features'—one with 45 degree slopes and the other with vertical walls.
 a chamfered key member for the entire profile except for the section where the shoulder locates into the slot at its shallowest point
 the shallowest point is set such that a key similar in (inverted) plan view key but different in location of profile features cannot apply torque as its end is chamfered and there is little vertical face to engage
 additionally, any torque applied to the vertical face which can engage may shear the profile features as so little material is engaged thus rendering the key entirely useless
 The slot contains a very slight chamfer which prevents burring of the edges and facilitates initial mating of key.

These features may be expanded in other embodiments such that keys could have square ends and an angled shoulder (essentially, the inverse of the current embodiment) such that illegal keys will have no vertical face to engage. The current embodiment is preferred due to there being an annular engagement surface at the minimum depth for the legal key which facilitates torque delivery. In some embodiments, chamfers are replaced by rounded profiles.

The machining to tight tolerances allows for the generation of a very large number of permutations in the plan view and a considerable number of permutations in the profile due to the vertical wall being a key obstruction with even minor interference. This has been built into the calculation of dimension as in a benefit in terms of the shear feature.

Automated Order Processing

Some embodiments, particularly those relating to security fasteners for bicycles, make use of an automated straight-through online order processing system which facilitates the machining of the relevant parts to order by use of an algorithm to generate machining code directly from the unique key code and subsequent integration of database entries, inventory control and work scheduling into a (potentially) seamless process.

The process makes use of a database of client details, components, key codes, key forms, inventory, bicycle components, and manufacturing parameters, and thereby allows for the ordering of security solutions by specific selection for each item to suit the individual bicycle by the relevant dimensions of the frame and/or component and/or by the manufacturer/model of the component being secured.

In outline, the process comprises the following features:
An online order form allows for input (for example, by means of a series of dropdown menu items) of those various relevant criteria relating to the cycle components and bicycle dimensions, for example:
  for saddles: bike type (road or mountain); seat post manufacturer; seat post model; tube diameter
  for wheels: front/rear wheel; bicycle type (racing/road/mountain); axle type (threaded/hollow/bolt-on); over lock-nut spacing (120/126/130/135 mm); manufacturer; model; and relevant others, such as:
    for a road bike: hollow axle (default selection); over lock nut spacing (default for road 130 mm); drop-out thickness (default 7 mm)
    for a fixed gear bike: solid axle (default); hub manufacturer; hub model; axle stub length
  for derailleurs: manufacturer; model; mounting details
Typically, selection of initial criteria determines the options for selection of subsequent criteria according to availability and compatibility information as stored in the database.
The user selections trigger a database lookup query which determines which parts to supply, encode for manufacture, according to stored solutions for the input criteria—and generate pricing information
An internal order is generated for the appropriate solution
The inventory database is automatically updated (which ultimately schedules work for turning on optimal batch sizes/spindle downtime/algorithm generated sales forecasts etc)
The order assigns a key code to the customer (keys are pre-manufactured due to post machining treatment processes) and updates the database with key/customer details
An inventory is made of the parts selected (ultimately by robot) and is fixtured for encoding
Key parameters are called from the database
An algorithm generates the unique key forms
  automatic output of CNC machine code for each unique key
  automatic write to database of (currently 16 digit randomly generated alphanumeric code)
Required parts are automatically machined
  Alternatives comprise an automated production cycle of keys using large fixture plate calling each individual key code as plate traversed
The entire process is potentially automated from machine through packaging
Reordering of existing keys is also enabled
  input existing key code
  automatic look up in database
  return parameters stored
  automatic translation to machinable format
  remanufacture replacement key or additional components
The above-described automated order-processing method is also applicable to some volume-produced parts such as track nuts. Such track nuts may embody one or more aspects described in this specification.

Regarding the integration of databases, some will be physically separate to prevent hacking. Typically, a random key code is assigned to a customer and stored in the database which integrates with front facing applications but to access the data critical to details of key form will require traversing a physical break to prevent hacking. Even if all key codes were to be compromised this would be of no use as they are random alphanumerics with no informational content other than matching entries in a physically inaccessible database.

The process of storing inventory of turned parts to encode later may transform to 'one hit' manufacturing on order for example.

It will be understood that there are many further applications of the security fastener as described above, such as for other components of a bicycle or for other applications where small diameter security fasteners are required. In addition, the potential permutations for the key receiving channel are extremely large. It must be further understood that the specific structures herein are disclosed in the figures as specific examples, and can carry any other form that meets and satisfies the principles of the security fastener as described herein. It is to be further understood that the drawings and the descriptions in this disclosure are preferred to facilitate the comprehension of the invention and should not be construed to limit the scope thereof.

The invention claimed is:

1. The combination of a rotary security fastener and a specific key, comprising:
  a fastener including a key receiving channel bounded by an outer wall defining a first profile, and by an inner wall defining a second profile, said key receiving channel defining at least one further profile; and
  a key including a male member having a shape that permit its entry into said key receiving channel only when said male member and said fastener are in a relative angular position that allows said key to engage at least one of said profiles to rotate said fastener,
  said profiles being configured to prevent the male member of a non-matching key from providing sufficient torque to loosen the fastener.

2. The combination of a rotary security fastener and a specific key of claim 1, wherein said key receiving channel has a length along at least a part of which said further profile extends and the depth of the further profile varies along said length of the channel.

3. The combination of a rotary security fastener and a specific key of claim 1, wherein said key receiving channel has a length along at least a part of which said further profile extends and said further profile has a gradient that varies along at least part of said length of the channel.

4. The combination of a rotary security fastener and a specific key of claim 3, wherein a rate of change of said gradient varies along at least part of the length of the channel.

5. The combination of a rotary security fastener and a specific key of claim 1, wherein said further profile is formed with at least one step.

6. The combination of a rotary security fastener and a specific key of claim 5, wherein said at least one step is a substantial proportion of the depth of said channel to prevent a non-matching key from providing sufficient torque to loosen the fastener.

7. The combination of a rotary security fastener and a specific key of claim 1, wherein said further profile at least in part is curved.

8. The combination of a rotary security fastener and a specific key of claim 1, wherein said further profile at least in part is sloped.

9. The combination of a rotary security fastener and a specific key of claim 1, wherein said further profile has at least one peak or plateau that is a substantial proportion of the depth of said channel, such that a non-matching key cannot provide sufficient torque to loosen the fastener.

10. The combination of a rotary security fastener and a specific key of claim 1, wherein said further profile is defined at least in part by any combination of steps, curves and slopes.

11. The combination of a rotary security fastener and a specific key of claim 1, wherein said further profile defines at least one obstruction, and said shape of said male member of said specific key is configured to avoid said obstruction, thereby enabling the male member of the specific key to fully enter the channel.

12. The combination of a rotary security fastener and a specific key of claim 11, wherein said obstruction defines at least one feature that is a substantial proportion of the depth of said channel, such that a non-matching key, even if it is compatible with said first and second profiles, cannot provide sufficient torque to loosen the fastener.

13. The combination of a rotary security fastener and a specific key of claim 1, wherein cross sections of said key receiving channel and said male member vary at least in part along their lengths to define said further profile.

14. The combination of a rotary security fastener and a specific key of claim 13, wherein said further profile is configured to prevent the male member of a non-matching key from fully entering said channel.

15. The combination of a rotary security fastener and a specific key of claim 1, wherein the male member is chamfered such that a contact surface between the key and the channel is angled, whereby a non-matching key cannot apply sufficient torque to loosen the fastener.

16. The combination of a rotary security fastener and a specific key of claim 1, wherein the channel is chamfered along at least part of its length to define the further profile, whereby a non-matching key cannot apply sufficient torque to loosen the fastener.

17. The combination of a rotary security fastener and a specific key of claim 1, wherein said further profile comprises a varying cross-section of at least one of the channel and the male member.

18. The combination of a rotary security fastener and a specific key of claim 17, wherein said varying cross-section impedes the insertion of a nonmatching key, thereby preventing the nonmatching key from applying sufficient torque to loosen the fastener.

19. The combination of a rotary security fastener and a specific key of claim 1, wherein said further profile is provided by relative side gradients of the male member and of the channel, whereby a non-matching key is unable to transmit sufficient torque to loosen the fastener.

20. The combination of a rotary security fastener and a specific key of claim 1, further comprising a chamfer at an entry to said key receiving channel, and a complementary chamfer formed on the key, said chamfers constituting said further profile to prevent the male member of a nonmatching key from entering said channel to transmit sufficient torque to loosen the fastener.

21. The combination of a rotary security fastener and a specific key of claim 1, wherein said fastener has a rotational axis and said inner and outer walls are substantially parallel with said rotational axis.

22. The combination of a rotary security fastener and a specific key of claim 1, wherein said inner and outer walls are substantially tapered from an outer surface of said fastener to a bottom of said key receiving channel, such that the channel has a width which is greater at said outer surface than at said bottom.

23. The combination of a rotary security fastener and a specific key of claim 1, wherein said key receiving channel is formed in an insert secured to said security fastener.

24. The combination of a rotary security fastener and a specific key of claim 1, wherein the key receiving channel is a curvilinear channel bounded by said outer wall to define said first profile, by said inner wall to define said second profile, and by said further profile defined at a base of said outer and inner walls, and said outer wall has been generated by a cutter to create said first profile of the key receiving channel.

25. The combination of a rotary security fastener and a specific key of claim 24, wherein said inner wall has been generated by a cutter to create said second profile of the key receiving channel.

26. The combination of a rotary security fastener and a specific key of claim 24, wherein said inner wall has been generated by a cutter to create an island in the fastener that defines the second profile of the key receiving channel.

27. The combination of a rotary security fastener and a specific key of claim 24, wherein a base of the inner and outer walls has been generated by a cutter to create said further profile of the key receiving channel.

28. The combination of a rotary security fastener and a specific key of claim 1, wherein the outer profile of the key receiving channel is of curvilinear form generated by a series of cylindrical bores which are joined to create a shape having sufficient drive surfaces to ensure that the specific key can transmit sufficient torque to the key receiving channel to loosen the fastener.

29. The combination of a rotary security fastener and a specific key of claim 28, wherein the inner profile of the key receiving channel is also of curvilinear form generated by a series of cylindrical bores which are joined to form the inner profile.

30. The combination of a rotary security fastener and a specific key of claim 1, wherein the key receiving channel is defined between two shapes defining the inner and outer walls and a shape defining the further profile at a bottom of the key receiving channel, and wherein these three shapes, their relative positions, and their relative angular orientations are matched by the specific complementary key.

31. The combination of a rotary security fastener and a specific key of claim 1, wherein a recess is formed in one of said walls at a specific angular position to match a surface of the specific complementary key.

32. The combination of a rotary security fastener and a specific key of claim 1, wherein the key receiving channel is not continuous.

33. The combination of a rotary security fastener and a specific key of claim 32, wherein an island bounded by said discontinuous channel is connected to said outer wall by at least one connecting member.

34. The combination of a rotary security fastener and a specific key of claim 1, further comprising an anti-rotation member having an abutment that is configured to engage a surface of a structure to be fastened so as to prevent rotation of the security fastener other than by use of the specific key.

35. The combination of a rotary security fastener and a specific key of claim 34, wherein said anti-rotation member is a dogged washer configured to engage said surface of said structure.

36. The combination of a rotary security fastener and a specific key of claim 1, wherein the security fastener is configured to fasten a bicycle component to a bicycle.

37. The combination of a rotary security fastener and a specific key of claim 36, wherein said key receiving channel is formed in an end of a threaded shaft or bolt constituting said rotary security fastener, and said end is shielded by said bicycle, or by part of said bicycle component, from engagement by any tool except said specific key.

38. The combination of a rotary security fastener and a specific key of claim 36, wherein said key receiving channel is formed in a head of a nut constituting said rotary security fastener, and said head is shielded by said bicycle, or by part of said bicycle component, from engagement by any tool except said specific key.

39. The combination of a rotary security fastener and a specific key of claim 1, wherein the key is weakened, so that it will break if any attempt is made to unlock any other security fastener in which full engagement cannot be achieved.

40. The combination of a rotary security fastener and a specific key of claim 1, wherein location marks are defined on the fastener and on the key to facilitate quick engagement thereof in said specific relative angular position.

41. A method of manufacturing a rotary security fastener for use with a specific key, said fastener being formed with a key receiving channel bounded by an outer wall defining a first profile and by an inner wall defining a second profile, said key receiving channel defining at least one further profile, said key including a male member having a complementary shape that permits its entry into said key receiving channel only when said male member and said fastener are in a relative angular position that allows said key to engage at least one of said profiles to rotate said fastener, and said profiles are configured to prevent the male member of a non-matching key from providing sufficient torque to loosen the fastener, said method comprising generating machining code defining said first, said second and said further profiles, and using said code to:

machine said key receiving channel in said rotary security fastener to define said first profile on said outer wall;

machine said key receiving channel in said rotary security fastener to define said second profile on said inner wall; and machine said key receiving channel in said rotary security fastener to define said further profile.

42. The method as in claim 41, further comprising:

storing information required to manufacture said first, said second and said further profiles in a database in association with identifying data relating to a respective one of a plurality of customers; and manufacturing at least a selected one of an additional security fastener and a key therefor for an existing customer using such stored information.

* * * * *